US012566881B2

(12) United States Patent
Mukherjee et al.

(10) Patent No.: US 12,566,881 B2
(45) Date of Patent: Mar. 3, 2026

(54) DATA PERMISSIONED LANGUAGE MODEL DOCUMENT SEARCH

(71) Applicant: Palantir Technologies Inc., Denver, CO (US)

(72) Inventors: Anirvan Mukherjee, Brooklyn, NY (US); Craig De Souza, Jersey City, NY (US); Edgar Gomes de Araujo, Sao Paulo (BR); Johannes Beil, Copenhagen (DK); Jessica Winssinger, New York, NY (US); Michael Zullo, Scarsdale, NY (US); Rushad Heerjee, New York, NY (US); Shubhankar Sachdev, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 145 days.

(21) Appl. No.: 18/505,912

(22) Filed: Nov. 9, 2023

(65) Prior Publication Data
US 2024/0354436 A1    Oct. 24, 2024

Related U.S. Application Data

(60) Provisional application No. 63/588,229, filed on Oct. 5, 2023, provisional application No. 63/497,932, filed on Apr. 24, 2023.

(51) Int. Cl.
*G06F 21/62* (2013.01)
*G06F 16/334* (2025.01)

(52) U.S. Cl.
CPC ...... *G06F 21/6227* (2013.01); *G06F 16/3344* (2019.01); *G06F 16/3347* (2019.01)

(58) Field of Classification Search
CPC ............. G06F 21/6227; G06F 16/3344; G06F 16/3347; G06F 16/338
(Continued)

(56) References Cited

U.S. PATENT DOCUMENTS

2018/0217990 A1 * 8/2018 Kumar ................ G06F 16/9535
2020/0379787 A1 * 12/2020 Martin .................. G06F 16/176
(Continued)

FOREIGN PATENT DOCUMENTS

WO    WO 2016/038397    3/2016
WO    WO 2023/242540    12/2023
WO    WO 2024/015321    1/2024

*Primary Examiner* — Meng Vang
(74) *Attorney, Agent, or Firm* — Knobbe, Martens, Olson & Bear, LLP

(57) ABSTRACT

Computer-implemented systems and methods are disclosed, including systems and methods utilizing language models for searching a large corpus of data. A computer-implemented method may include: receiving a first user input comprising a natural language query; vectorizing the first user input into a query vector; executing, using the query vector, a similarity search in a document search model to identify one or more similar document portions, where the document search model includes a plurality of vectors corresponding to a plurality of portions of a set of documents; generating a first prompt for a large language model ("LLM"), the first prompt including at least the first user input, and the one or more similar document portions; transmitting the first prompt to the LLM; receiving a first output from the LLM in response to the first prompt; and providing, via a user interface, the first output from the LLM.

20 Claims, 14 Drawing Sheets

(58) Field of Classification Search
USPC ........................................................ 726/23
See application file for complete search history.

(56) References Cited

U.S. PATENT DOCUMENTS

| 2021/0294970 A1* | 9/2021 | Bender | G06F 16/3329 |
| 2023/0360388 A1 | 11/2023 | Singh | |
| 2023/0385085 A1 | 11/2023 | Singh | |
| 2023/0396637 A1 | 12/2023 | Hebbagodi et al. | |
| 2023/0410801 A1 | 12/2023 | Mishra | |
| 2024/0273291 A1* | 8/2024 | Smith | G06F 16/383 |
| 2024/0281747 A1* | 8/2024 | Chapman | G06F 16/906 |
| 2024/0330342 A1* | 10/2024 | Chhatpar | G06F 16/3347 |
| 2024/0340502 A1* | 10/2024 | Michurin | H04N 21/8547 |
| 2024/0346255 A1* | 10/2024 | Blohm | G06F 40/30 |
| 2024/0354317 A1* | 10/2024 | Fayyaz | G06F 16/313 |

* cited by examiner

Figure 4:
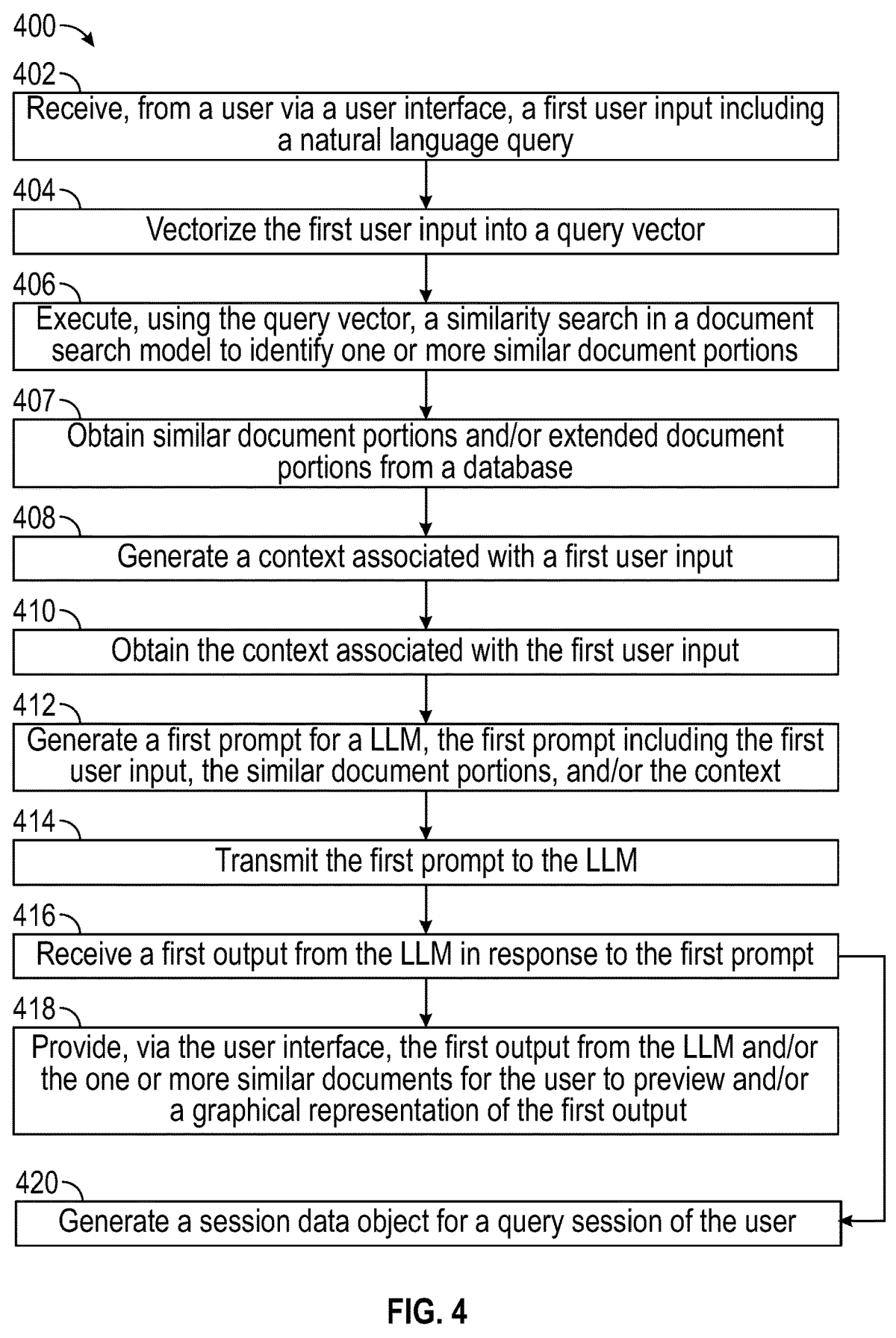

400

402
Receive, from a user via a user interface, a first user input including a natural language query 404
Vectorize the first user input into a query vector 406
Execute, using the query vector, a similarity search in a document search model to identify one or more similar document portions 407
Obtain similar document portions and/or extended document portions from a database 408
Generate a context associated with a first user input 410
Obtain the context associated with the first user input 412
Generate a first prompt for a LLM, the first prompt including the first user input, the similar document portions, and/or the context 414
Transmit the first prompt to the LLM 416
Receive a first output from the LLM in response to the first prompt 418
Provide, via the user interface, the first output from the LLM and/or the one or more similar documents for the user to preview and/or a graphical representation of the first output 420
Generate a session data object for a query session of the user

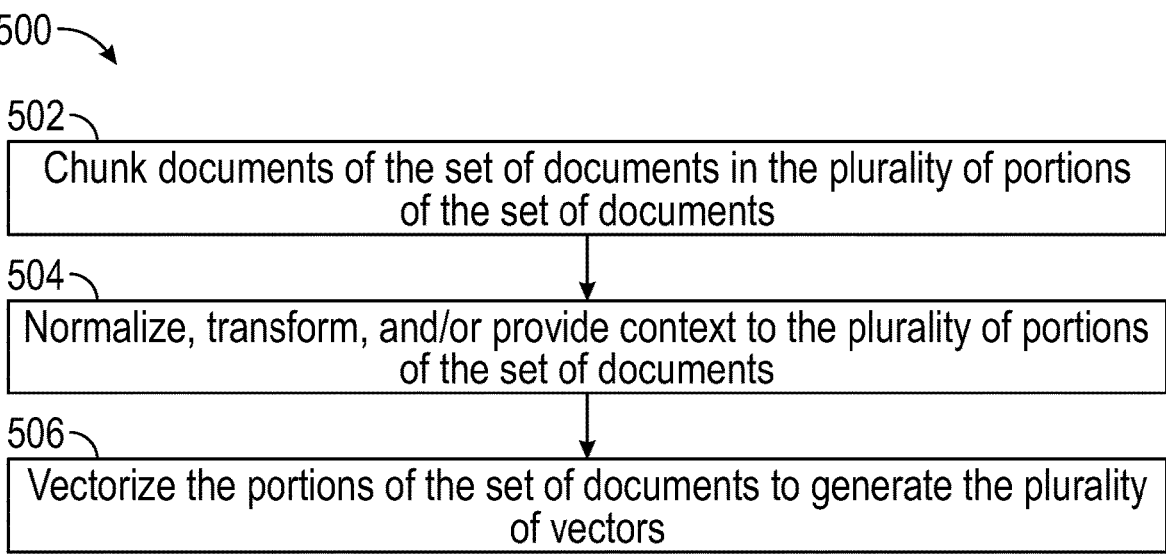

502

Chunk documents of the set of documents in the plurality of portions of the set of documents

504

Normalize, transform, and/or provide context to the plurality of portions of the set of documents

506

Vectorize the portions of the set of documents to generate the plurality of vectors

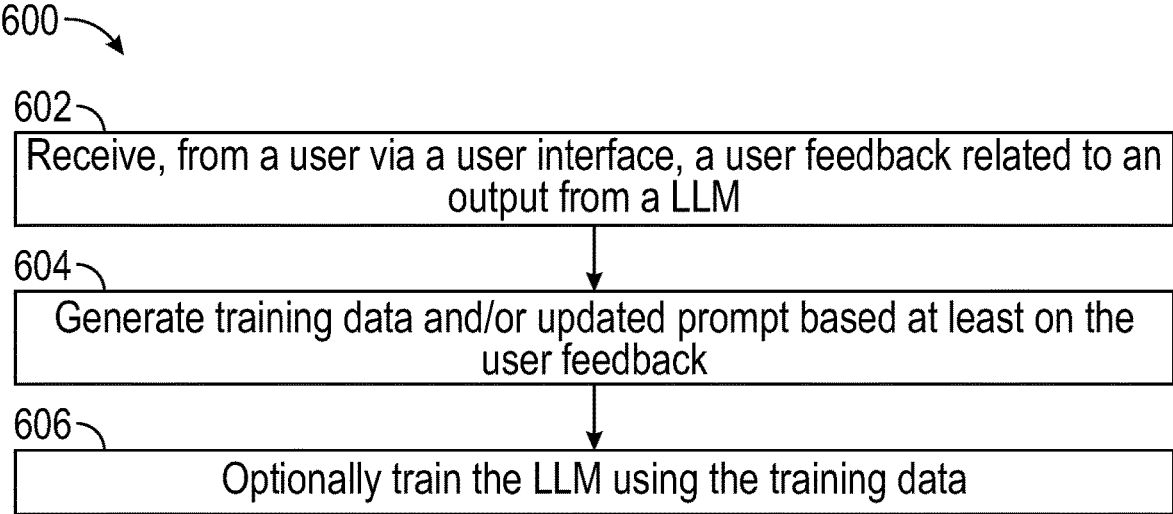

602

Receive, from a user via a user interface, a user feedback related to an output from a LLM

604

Generate training data and/or updated prompt based at least on the user feedback

606

Optionally train the LLM using the training data

FIG. 6

DATA PERMISSIONED LANGUAGE MODEL DOCUMENT SEARCH

CROSS-REFERENCE TO RELATED APPLICATIONS

This application claims benefit of U.S. Provisional Patent Application No. 63/497,932, filed Apr. 24, 2023, and titled "DATA PERMISSIONED LANGUAGE MODEL DOCU-MENT SEARCH," and U.S. Provisional Patent Application No. 63/588,229, filed Oct. 5, 2023, and titled "DATA PERMISSIONED LANGUAGE MODEL DOCUMENT SEARCH." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for utilizing computer-based models. More specifically, the present disclosure relates to computerized systems and techniques for using large language models to search corpus of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations utilizing one or more computer-based models. For example, language models can be utilized to provide and/or predict a probability distribution over sequences of words.

SUMMARY

The systems, methods, and devices described herein each have several aspects, no single one of which is solely responsible for its desirable attributes. Without limiting the scope of this disclosure, several non-limiting features will now be described briefly. For ease of discussion, certain implementations described herein relate to using one or more Large Language Models ("LLMs") to search a large set of documents based on a user query. Because a LLM may only handle prompts within a limited size, certain embodi-ments described herein generate a prompt for the LLM based on portions of the large set of documents similar to the user query rather than including the large set of documents in its entirety into the prompt.

The present disclosure implements systems and methods (generally collectively referred to herein as "a document search system" or simply a "system") that can advanta-geously employ one or more LLMs for searching a large corpus of data (e.g., a set of documents) while also respect-ing security and/or permissioning of users, systems, data, and/or the like. The present disclosure further includes various processes, functionality, and interactive graphical user interfaces related to the system. According to various implementations, the system (and related processes, func-tionality, and interactive graphical user interfaces), can advantageously enable natural language searching and response, utilizing one or more LLMs, with references to a large set of documents, without being constrained by a size limit on prompts for the LLMs. Additionally, permissioning of data can be respected and a system or user can ensure that one or more LLMs only provides, for example, responses that are based on permitted information sources that users are authorized to access. By employing various implemen-tations of the systems and methods described herein, the system or user can enable LLMs to search a large corpus of data relevant to user queries while simultaneously avoid providing impermissible documents to LLMs, thus advan-tageously facilitating effective search on large corpus of documents and helping preserve confidentiality of sensitive information.

Various embodiments of the present disclosure provide improvements to various technologies and technological fields. For example, as described above, the system may advantageously generate a prompt for the LLM based on portions of a set of documents similar to the user query for enabling natural language searching and response, utilizing one or more LLMs, with references to a large set of documents, without being constrained by a size limit on prompts for the LLMs. Other technical benefits provided by various embodiments of the present disclosure include, for example, respecting permissioning of data and ensuring that one or more LLMs only provides responses that are based on permitted information sources that users are authorized to access.

Additionally, various embodiments of the present disclo-sure are inextricably tied to computer technology. In par-ticular, various embodiments rely on detection of user inputs via graphical user interfaces, calculation of updates to dis-played electronic data based on those user inputs, automatic processing of related electronic data, application of language models and/or other artificial intelligence, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reason-ably be performed by humans alone, without the computer technology upon which they are implemented. Further, the implementation of the various embodiments of the present disclosure via computer technology enables many of the advantages described herein, including more efficient inter-action with, and presentation of, various types of electronic data.

According to various implementations, large amounts of data are automatically and dynamically calculated interac-tively in response to user inputs, and the calculated data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be config-ured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, models and model-related data, and may enable a user to more quickly and accurately access, navigate, assess, and digest the model-related data than previous systems.

Further, the interactive and dynamic user interfaces described herein are enabled by innovations in efficient interactions between the user interfaces and underlying systems and components. For example, disclosed herein are improved methods for enabling natural language searching and response, utilizing one or more LLMs, with references to a large set of documents without being constrained by a size limit on prompts for the LLMs. According to various implementations, the system (and related processes, functionality, and interactive graphical user interfaces), can advantageously generate a prompt for the LLMs using a user query and portions of a set of documents that are more relevant or bear similarity to the user query, rather than including the set of documents in its entirety that might exceed a size limit on the prompt into the prompt. Additionally, permissioning of data can be respected and a system or user can ensure that one or more LLMs only provides, for example, responses that are based on permitted information sources that users are authorized to access. As such, the system may advantageously facilitate effective search on large corpus of documents and help preserve confidentiality of sensitive information.

Thus, various implementations of the present disclosure can provide improvements to various technologies and technological fields, and practical applications of various technological features and advancements. For example, as described above, existing computer-based model management and integration technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management of various types of electronic data (including computer-based models).

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise one or more computer-readable storage mediums having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums are disclosed, wherein the computer-readable storage medium(s) have program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 is an example flow chart depicting an example routine for utilizing a LLM to search a set of documents based on a user query that may be performed by the document search system, according to various embodiments of the present disclosure;

FIG. 5 is a flow chart depicting an example routine for generating the document search model of the document search system, according to various embodiments of the present disclosure;

FIG. 6 is a flow chart depicting an example routine for generating training data based on user feedback to train one or more LLMs of the document search system, according to various embodiments of the present disclosure;

DETAILED DESCRIPTION

Figure 1A:
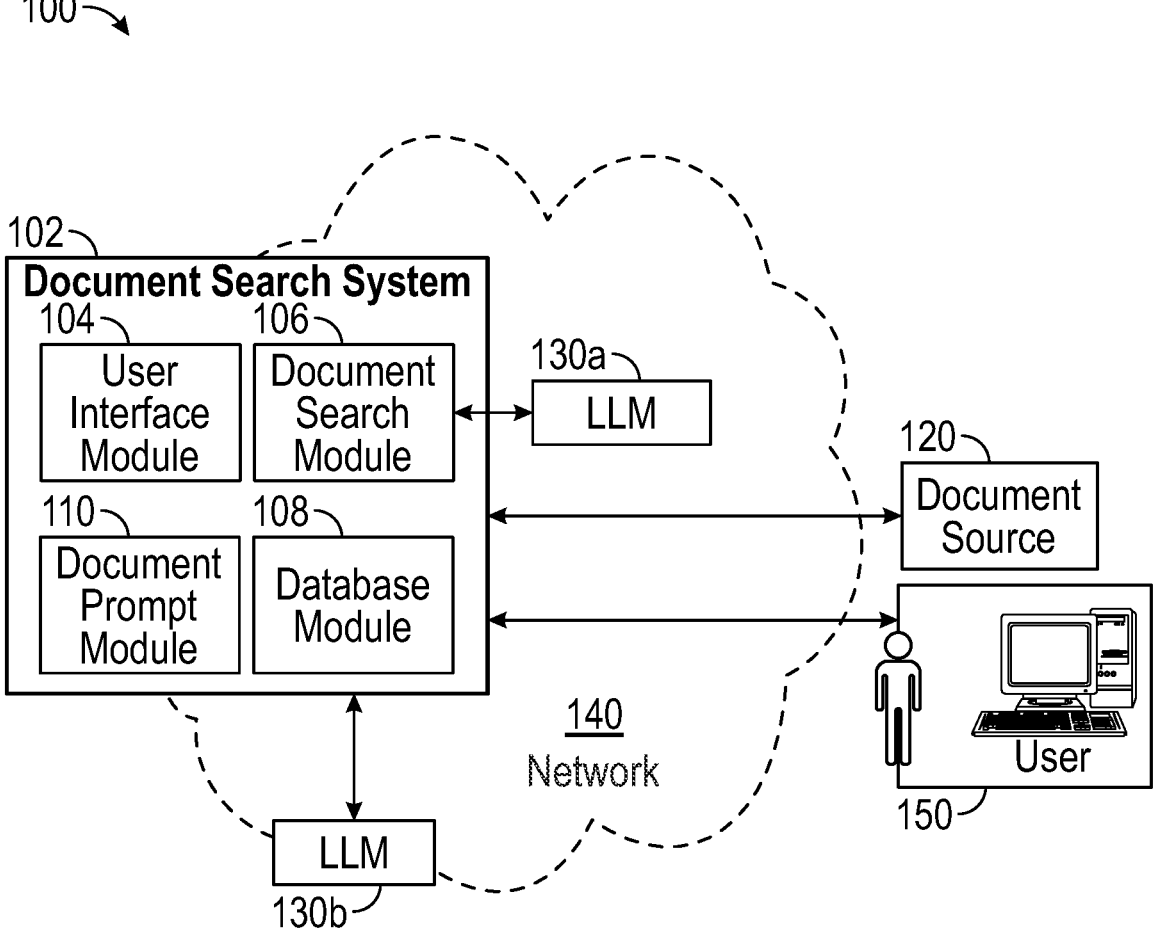
FIG. 1A is a schematic block diagram illustrating an example document search system in an example computing environment, according to various embodiments of the present disclosure.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

A Large Language Model ("LLM") can be a neural network and with many parameters and trained on large quantities of unlabeled text using, e.g., self-supervised learning. LLMs can be extremely useful for natural language processing, including receiving natural language prompts and providing natural language responses based on the text on which the model is trained. However, LLMs may only handle prompts within a limited size. For example, LLMs can only handle natural language prompts within a limited token size and may not handle natural language prompts that include whole set of documents that a user wants to search or query. Additionally, LLMs are not data security-aware or data permissions-aware, because they do not retain permissions information associated with the text upon which they are trained. Responses provided by LLMs are based on the underlying trained model, and not any particular permissions-based portion of the model. As such, LLMs may generate responses for users based on information the users are unauthorized or unpermitted to access. These characteristics of LLMs make them poorly suited for applications where searching on large corpus of data or permissioning of data are desired.

As noted above, the present disclosure describes examples of a document search system (or simply a "system") that can advantageously overcome various of the technical challenges mentioned above, among other technical challenges. For example, various implementations of the systems and methods of the present disclosure can advantageously employ one or more LLMs for searching a large corpus of data (e.g., a set of documents) while also respecting security and/or permissioning of users, systems, data, and/or the like. Advantageously, the system can enable natural language searching and response, utilizing one or more LLMs, with references to a large set of documents, without being constrained by a size limit on prompts for the LLMs. Additionally, permissioning of data can be respected and a system or user can ensure that one or more LLMs only provides, for example, responses that are based on permitted information sources that users are authorized to access. By employing various implementations of the systems and methods described herein, the system or user can enable LLMs to search a large corpus of data relevant to user queries while simultaneously avoid providing impermissible documents to LLMs, thus advantageously facilitating effective search on large corpus of documents and helping preserve confidentiality of sensitive information.

More specifically, in response to receiving a user query from a user, the system may search among a set of documents that the user is permitted or authorized to access for texts relevant to the user query, and generate a prompt for a LLM based on results of the search. For example, the system may generate the prompt for the LLM using the user query and portions of the set of documents that are more relevant or bear similarity to the user query, instead of including the set of documents in its entirety into the prompt. As such, the system can enable natural language searching and response, utilizing the LLM, with references to a large set of documents, without being constrained by a size limit on a prompt for the LLM. rather than providing response that may be generic or prone to hallucination, the LLM may output focused, specific, or on the point responses based on particular information sources not only permissioned to the user but more relevant to the user query. To further avoid LLM hallucination, the system may further use context associated with the user query to generate prompt for the LLM, in addition to using the user query and the portions of the set of documents that are permissioned to the user and relevant to the user query.

The system can advantageously prevent the LLM from generating responses based on information impermissible to the user while assisting the LLM in generating responses consistent with context associated with the user. In addition to the benefits discussed above, the system can further advantageously provide various other technical benefits and features such as, for example, reducing risk of generating false or misleading responses by excluding irrelevant or impermissible data source; performance improvements by formulating efficient and narrowly-tailored queries; real-time, dynamic and evolving representation of data through on-the-fly entity graph creation; accuracy improvements by fine-tuning models based on post hoc feedback; and provision of comprehensive knowledge base for reference and analysis through object models building.

Example Document Search-Related Features

As noted above, the system may search and identify (e.g., through a document search model) relevant data permissioned to a user in response to receiving a user query from the user. Data that may be queried using the systems and methods of the present disclosure may include any type of electronic data, such as text, files, documents, books, manuals, emails, images, audio, video, databases, metadata, positional data (e.g., geo-coordinates), sensor data, web pages, time series data, and/or any combination of the foregoing and/or the like. Such data may be permissioned and/or have security information associated with it at any level of granularity, and the user may be permitted to access such data while some others may not. Data and/or documents that may be queried by the user can be obtained from a data source (e.g., a third-party or data source external to the system) and stored in a database of the system using an ontology, or based on an ontology, which may define document/data types and associated properties, and relationships among documents/data types, properties, and/or the like. In various examples, the user query may be a natural language query, and the system is expected to return a natural language output responsive to the natural language query. As discussed in further detail below, the system may identify relevant portions of a set of documents based on the user query through chunking and vectorizing documents and executing similarity search on documents.

Example Features Related to Chunking and Vectorizing Document

The system may extract, clean, and/or chunk a set of documents stored in the database of the system into a plurality of portions/segments of the set of documents. For example, the system may chunk documents into a plurality of words, sentences, paragraphs, and/or the like. The text chunks (e.g., the plurality of portions of the set of documents) may be stored in an ontology, or based on an ontology, which may define document/data types and associated properties, and relationships among documents/data types, properties, and/or the like. The system may select the granularity (e.g., words, sentences, paragraphs, and/or the like) for chunking documents based on various criterion, such as a size of the set of documents, a type of the set of documents, a type of similarity search as described herein, a user feedback as described herein, and/or the like.

The system may further vectorize the text chunks to generate a plurality of vectors, where each of the plurality of vectors corresponds to a chunked portion/segment (e.g., a word, a sentence, a paragraph, or the like) of the set of documents. Each text chunk and vector may be associated with a reference identification number (ID) and each text chunk and vector as well as an associated reference ID may be stored in the ontology of the system as noted above. Further, each vector may be a mathematical representation of semantic content associated with a corresponding chunked portion of the set of documents. The system may also vectorize the user query into a query vector. In various examples, the system may employ a language model such as a LLM (e.g., GPT-2) to vectorize the user query and portions of the set of documents permissioned to the user.

Additionally and/or optionally, the system may normalize, transform, and/or provide context to the to the plurality of portion of the set of documents before and/or after vectorizing the plurality of portion of the set of documents. For example, based on the context associated with the user query, the system may replace a generic phrase (e.g., company) in the plurality of portions of the set of documents into a specific phrase consistent with the context (e.g., a name of a particular company). Advantageously, the normalization, transformation, and/or provisioning of context to the plurality of portions of the set of documents may enable the system (including the LLM) to more accurately identify portions of the set of documents that are more relevant to the user query.

In various implementations, the system may chunk, vectorize, normalize (and/or the like) the set of documents in advance (e.g., as a preprocessing operation or before receiving a user query). Alternatively, the system may chunk, vectorize, normalize (and/or the like) the set of documents in real-time (e.g., chunking, vectorizing, and/or the like, based on a subset of a user query or a user operation on a user interface.

Example Features Related to Document Similarity Search

Based on the query vector and the plurality of vectors generated from vectorizing portions (e.g., text chunks) of the set of documents permissioned to the user, the system may execute a similarity search between the query vector and the plurality of vectors to identify one or more documents portions that are more relevant or similar to the user query. The system may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms. In various examples, the similarity search may yield n most similar portions of the set of documents in light of the user query, where n may be any positive integer. In various examples, n may be 40, 50, 100, 200, or any other positive integers. Additionally and/or alternatively, the similarity search may yield similar document portions having a threshold similarity with the first user input. In various examples, the threshold similarity may be adjustable by the system or a user. Additionally, the similarity search may further return reference IDs of the vectors corresponding to the n most similar portions of the set of documents. The system may also store the result of the similarity search in the database of the system using an ontology, or based on an ontology, which may define document/data types and associated properties, and relationships among documents/data types, properties, and/or the like. Advantageously, the returned reference IDs may allow the system more efficiently locate and access the n most similar portions of the set of documents for generating a prompt to a LLM for responding to the user query. Depending on the limit on the size of the prompt to the LLM and/or size of the similar portions of the set of documents, the system may increase or decrease n to balance system accuracy, performance and efficiency.

Additionally and/or optionally, rather than executing similarity search based on purely literal matching between the query vector and the plurality of vectors, the system may effect similarity search based on meanings of the user query and portions of the set of documents. As noted above, the system may vectorize chunked portions of the set of documents into mathematical representations of the semantic contents of the chunked portions of the set of documents. As such, the system may then execute similarity search to identify portions of the set of documents most similar in meaning to the user query. Advantageously, using portions of the set of documents most similar to the user query semantically to generate a prompt to a LLM may enable the system to receive more accurate or desired response from the LLM for the system to responding to the user query.

Example Features Related to Prompt Generation

Based on the similarity search result that may be stored in the database using an ontology, the system may query the ontology to obtain portions of the set of documents similar to the user query. For example, the system may query the ontology using the reference IDs of the vectors corresponding to the n most similar portions of the set of documents returned by the similarity search to retrieve/obtain portions of the set of documents similar to the user query. In various examples, the system may further retrieve/obtain extended portions of the set of documents that are adjacent to the portions of the set of documents similar to the user query. For example, the extended portions of the set of documents may be include sentences immediately before and/or after sentences of the set of documents that match to the user query, and/or paragraphs in which the sentences of the set of documents that match to the user query are found.

The system may then generate a prompt for a LLM based at least on the user query and the portions of the set of documents similar to the user query. The prompt may include the user query and the portions of the set of documents similar to the user query. The system may then transmit the prompt to the LLM for the LLM to generate an output. Alternatively and/or optionally, the prompt may include instructions that instruct the LLM to refer to the portions of the set of documents similar to the user query in generating output responsive to the user query. Advantageously, the LLM may refrain from accessing documents impermissible to the user or documents that are irrelevant to the user query, and may generate output based on particular corpus of data that the user is authorized or permitted to access. Additionally and/or optionally, the system may generate the prompt based on the user query, the portions of the set of documents similar to the user query, and the extended portions of the set of documents that are adjacent to the portions of the set of documents similar to the user query.

In various examples, the system may generate a prompt for the LLM based on a template response if the portions of the set of documents similar to the user query do not provide an answer to the user query or if the system determines that the user query is directed toward documents outside scope of permissible documents to the user that submitted the user query. For example, if the portions of the set of documents similar to the user query do not provide an answer to the user query or if the user query relates to sensitive information (e.g., confidential military or regulatory information) about an entity with which the user is unauthorized to access, the system may generate a prompt that instructs the LLM to generate the template response (e.g., "I don't know," or the like) rather than speculate an answer. As such, the LLM may be prevented from hallucinating a response or generating a response based on a generic or large corpus of data that the LLM was trained on. Advantageously, rather than generating generic responses that are inconsistent with context of the user query, the LLM is more likely to generate responses tailored to context of the user query while preserving data security.

The system may generate a prompt for a LLM for responding to a user query further based on a context associated with the user query or a user that submitted the user query. Context may include any information associated with a user, user session, or some other characteristics. For example, context may include all or part of a conversation history from one or more sessions with the user. Because a typical LLM is stateless (e.g., doesn't remember previous prompts or replies provided to a particular user), generating a prompt for the LLM based on the context in addition to the user query and portions of the set of documents similar to the user query can assist the LLM in generating output that is less prone to hallucination and more likely to meet the expectation of the user. To utilize context associated with the user query to generate the prompt for the LLM, the system may capture, synchronize, and/or store context data (e.g., session detail associated with the user query, user information, timestamps of events, previous user queries and responses from the LLM) in data objects (e.g., a session data object as described herein) and/or an ontology maintained by the system.

Additionally and/or optionally, the system may condense the context when generating the prompt for the LLM. Specifically, the system may condense the context and/or the prompt such that a size of the prompt generated by the system for the LLM does not exceed or overflow a size limit on the prompt for the LLM. In various examples, rather than directly incorporating entire conversation history of a user session in which the user query is made, the system may generate a context associated with the user query by summarizing the conversation history to condense the prompt within the size limit. For example, the system may summarize the conversation history using another LLM or using the LLM to which the prompt is to be transmitted. Advantageously, generating the prompt for the LLM while condensing the prompt enables the system to provide the prompt for the LLM that is detailed enough without exceeding a size limit of a prompt window.

Example Features Related to User Interfaces

The system may further allow user to interact with the system through a user interface (e.g., a graphical user interface ("GUI") or other types of user interfaces), and receive a user query for a LLM or provide output from the LLM. In various implementations, in addition to providing the output from the LLM, the system may provide through the user interface the portions of a set of documents similar to the user query for a user to preview such that the user may have a better understanding about the basis of the output from the LLM. Additionally and/or optionally, the system may provide a graphical representation of the output from the LLM through the user interface to enhance user experience.

In various implementations, the system may include mechanisms, through the user interface, for providing feedback to a LLM after processing is complete. In various implementations, the feedback may indicate whether the output of the LLM's processing was a correct or acceptable result given the user query. The feedback may be generated manually by a user or automatically by the system. In various implementations, the system may use the feedback to fine-tune the performance of the LLM, such as by adjusting or modifying one or more weights associated with the LLM, or trigger training and/or re-training of the LLM. Additionally, the system may use the user feedback about the output from the LLM to generate an updated prompt for the LLM.

Additionally and optionally, a user may configure the system and/or the LLM through manipulating the user interface. For example, the user may adjust the granularity for chunking documents and vectorizing chunked texts. More specifically, for the same set of documents, the user may configure the system to chunk the set of documents into words, sentences, or paragraphs for vectorization or for the LLM to analyze. When the granularity is getting finer (e.g., from paragraphs to sentences), the computational resources utilized by the system and/or the LLM to respond to the user query may increase but the output of the LLM may be more accurate or more likely to meet the user's expectation.

Example Features Related to Data Objects

The system may employ database(s) that uses ontology and data objects to store, represent and/or organize data utilized by the system. The system may capture and synchronize data or information associated with a user session (e.g., questions from a user, answers provided to the user, timestamps of events of the user session, user profile information, or the like) into an ontology associated with a database. As such, data utilized by the system may be organized and linked to relevant context for providing a comprehensive knowledge base for auditing, reference, and analysis.

In various implementations, a body of data may be conceptually structured according to an object-centric data model represented by the ontology. The ontology may include stored information providing a data model for storage of data in the database. The ontology may be defined by one or more object types, which may each be associated with one or more property types. At the highest level of abstraction, data object may be a container for information representing things in the world. For example, data object can represent a document or other unstructured data source such as an e-mail message, a news report, or a written paper or article. Additionally, data object can represent an entity such as a person, a place, an organization, a market instrument, or other noun. Data object can further represent an event that happens at a point in time or for a duration. Each data object may be associated with a unique identifier that uniquely identifies the data object within the database of the system.

In various implementations, the system may utilize a "session data object" to store information and/or data associated with a user session of a user in a database of the system for various purposes. The session data object may include data objects or may be linked to data object(s) that represent documents, unstructured data sources, timestamps of events (e.g., when one or more user queries of the user are received and/or responded), profiles of the user, or the like that are associated with the user session. For example, queries of the user and/or history of answers (including, but not limited to, who asked a particular question, what answer was provided to the particular question, and based on which document(s) the answer was generated) can be stored by the system using the session data object and/or data objects associated with the session data object for later auditing. The system may utilize the session data object and/or additional data objects to automatically generate research reports for compliance or regulatory reviews, detecting out of policy use, or other purposes. Advantageously, session data objects stored in the database of the system may enable information associated with the user session to be easily auditable. The system may further utilize information stored using the session data object and/or other data objects to evaluate if the LLM hallucinate or if the LLM accesses documents or data sources a user that submitted a user query is not permitted to access.

Example Large Language Model Functionality

The system may employ one or more LLMs to provide various services. For example, the system may allow users to query unstructured internal or third-party data using a QA (question and answer) LLM that is trained to generate answers from user queries. In various implementations, the LLMs utilized by the system may be locally hosted, cloud managed, accessed via one or more Application Programming Interfaces ("APIs"), and/or any combination of the foregoing and/or the like. Data that may be queried using the LLMs may include any type of electronic data, such as text, files, documents, books, manuals, emails, images, audio, video, databases, metadata, positional data (e.g., geo-coordinates), sensor data, web pages, time series data, and/or any combination of the foregoing and/or the like. Such data may be permissioned and/or have security information associated with it at any level of granularity.

Additionally, the system may provide the flexibility of easily swapping between various language models employed by the system to provide various services. For example, the system may swap the QA LLM (e.g., switching between GPT-2 to GPT-3) for generating answers based on user queries. Such model swapping flexibility provided by the system may be beneficial in various aspects, such as experimentation and adaptation to different models based on specific use cases or requirements, providing versatility and scalability associated with services rendered by the system.

In other embodiments, the system can incorporate and/or communicate with one or more LLMs to perform various functions, such as chunking, vectorizing, executing similarity search on sets of documents permissioned to a user. The communication between the system and the one or more LLMs may include, for example, a context associated with an aspect or analysis being performed by the system, a user-generated prompt, an engineered prompt, prompt and response examples, example or actual data, and/or the like. For example, the system may employ an LLM, via providing an input (e.g., a user query) to, and receiving an output (e.g., an answer to the user query) from, the LLM. The output from the LLM may be parsed and/or a format of the output may be updated to be usable for various aspects of the system.

Further Example Information Related to Various Implementations

To facilitate an understanding of the systems and methods discussed herein, several terms are described below and herein. These terms, as well as other terms used herein, should be construed to include the provided descriptions, the ordinary and customary meanings of the terms, and/or any other implied meaning for the respective terms, wherein such construction is consistent with context of the term. Thus, the descriptions below and herein do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality. LLMs can be useful for natural language processing, including receiving natural language prompts and providing natural language responses based on the text on which the model is trained. LLMs may not be data security- or data permissions-aware, however, because they generally do not retain permissions information associated with the text upon which they are trained. Thus, responses provided by LLMs are typically not limited to any particular permissions-based portion of the model.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

A Prompt (or "Natural Language Prompt" or "Model Input") can be, for example, a term, phrase, question, and/or statement written in a human language (e.g., English, Chinese, Spanish, and/or the like), and/or other text string, that may serve as a starting point for a language model and/or other language processing. A prompt may include only a user input or may be generated based on a user input, such as by a prompt generation module (e.g., of a document search system) that supplements a user input with instructions, examples, and/or information that may improve the effectiveness (e.g., accuracy and/or relevance) of an output from the language model. A prompt may be provided to an LLM which the LLM can use to generate a response (or "model output").

A User Input (or "Natural Language Input") can be, for example, a term, phrase, question, and/or statement written in a human language (e.g., English, Chinese, Spanish, and/or the like), and/or other text string, that is provided by a user or on behalf of a user, such as via a keyboard, mouse, touchscreen, voice recognition, and/or other input device. User input can include a task to be performed, such as by an LLM, in whole or in part. User input can include a request for data, such as data accessed and/or processed by one or more services. User input can include one or more queries, one or more questions, one or more requests, or the like. For example, user input may include one or more natural language questions for some document search and/or data analysis to be performed, among other types of user inputs.

A Context can include, for example, any information associated with user inputs, prompts, responses, and/or the like, that are generated and/or communicated to/from the user, the document search system, the LLM, and/or any other device or system. For example, context may include a conversation history of all of the user inputs, prompts, and responses of a user session. Context may be provided to an LLM to help an LLM understand the meaning of and/or to process a prompt, such as a specific piece of text within a prompt. Context can include information associated with a user, user session, or some other characteristic, which may be stored and/or managed by a context module. Context may include all or part of a conversation history from one or more sessions with the user (e.g., a sequence of user prompts and/or user selections (e.g., via a point and click interface or other graphical user interface). Thus, context may include one or more of: previous analyses performed by the system, previous prompts provided by the user, previous conversation of the user with the language model, a role of the user, a context associated with a user input, a user question, or a user query, and/or other contextual information.

An Ontology can include stored information that provides a data model for storage of data in one or more databases and/or other data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

A Data Object (or "Object") is a data container for information representing a specific thing in the world that has a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (also referred to as "contents") may be represented in one or more properties. Attributes may include, for example, metadata about an object, such as a geographic location associated with the item, a value associated with the item, a probability associated with the item, an event associated with the item, and so forth.

An Object Type is a type of a data object (e.g., person, event, document, and/or the like). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

A Data Store is any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A Database is any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, extensible markup language (XML) files, TEXT (TXT) files, flat files, spread-sheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various embodiments such data may be combined and/or separated in any appropriate way into one or more databases, one or more tables of one or more databases, and/or the like. According to various implementations, any database(s) described in the present disclosure may be replaced by appropriate data store(s). Further, data source(s) of the present disclosure may include one or more databases, one or more tables, one or more data sources, and/or the like, for example.

Example System and Related Computing Environment

FIG. 1A illustrates an example computing environment 100 including an example document search system 102 in communication with various devices to respond to a user input or a user query, according to various implementations of the present disclosure. The example computing environment 100 includes the document search system 102, an LLM 130a, an LLM 130b, a network 140, a document source 120, and a user 150 (and/or user computing device). In the example of FIG. 1A, the document search system 102 comprises various modules, including a user interface module 104, a document search module 106, a database module 108, and a document prompt module 110. In other embodiments, the document search system 102 may include fewer or additional components.

In the example of FIG. 1A, the various devices are in communication via a network 140, which may include any combination of networks, such as one or more local area network (LAN), personal area network (PAN), wide area network (WAN), the Internet, and/or any other communication network. In various implementations, modules of the illustrated components, such as the user interface module 104, the document search module 106, the database module 108, and the document prompt module 110 of the document search system 102, may communicate via an internal bus and/or via the network 140.

The user interface module 104 is configured to generate user interface data that may be rendered on a user 150, such as to receive an initial user input, as well as later user input that may be used to initiate further data processing. In various implementations, the functionality discussed with reference to the user interface module 104, and/or any other user interface functionality discussed herein, may be performed by a device or service outside of the document search system 102 and/or the user interface module 104 may be outside the document search system 102. In various examples, a user query from the user 150 may be a natural language query, and the document search system 102 is expected to return a natural language output responsive to the natural language query from the user 150. Example user interfaces are described in greater detail below.

The document search module 106 is configured to search and identify (e.g., through a document search model not shown in FIG. 1A) relevant data permissioned to the user 150 in response to receiving a user query from the user 150. As discussed in further detail below, the document search module 106 may identify relevant portions of a set of documents based on the user query from the user 150 through chunking and vectorizing documents and executing similarity search on documents.

The database module 108 is configured to store data that may be queried by the user 150 and/or various aspects of the document search system 102, as described herein. Data that may be queried by the user 150 may include any type of electronic data, such as text, files, documents, books, manuals, emails, images, audio, video, databases, metadata, positional data (e.g., geo-coordinates), sensor data, web pages, time series data, and/or any combination of the foregoing and/or the like. Such data may be permissioned and/or have security information associated with it at any level of granularity, and the user 150 may be permitted to access such data while some others may not. The database module 108 may store the data and/or documents using an ontology, or based on an ontology, which may define document/data types and associated properties, and relationships among documents/data types, properties, and/or the like. The database module 108 of the document search system 102 may obtain data and/or documents from a document source 120.

The document prompt module 110 is configured to generate a prompt to a language model, such as LLM 130a. As described in further detail below, the document prompt module 110 may generate such a prompt based on data provided by the user interface module 104 (e.g., a user input or a user query) and/or other modules (e.g., one or more document portions that are more relevant or similar to the user query identified by the document search module 106) of the document search system 102.

The document source 120 is configured to store data and/or documents that may be queried by the user 150 and/or various aspects of the document search system 102, where the stored data and/or documents may be obtained by the document search system 102. The document source 120 may be a third-party or data source external to the document search system 102. The document source 120 may contain sensitive information including, but not limited to, confidential military or regulatory information about an entity with which the user 150 may or may not be authorized to access.

The document search system 102 may include and/or have access to one or more large language models or other language models (e.g., LLM 130a and LLM 130b), and the LLM may be fine-tuned or trained on appropriate training data (e.g., annotated data showing correct or incorrect pairings of sample natural language queries and responses). After receiving a user input from the user 150, the document search system 102 may generate and provide a prompt to a LLM 130a, which may include one or more large language models trained to fulfill a modeling objective, such as question and answer, task completion, text generation, summarization, etc.

As shown in FIG. 1A, the document search system 102 may be capable of interfacing with multiple LLMs. This allows for experimentation, hot-swapping and/or adaptation to different models based on specific use cases or requirements, providing versatility and scalability to the system. In various implementations, the document search system 102 may interface with a second LLM 130b in order to, for example, generate some or all of a natural language prompt for the first LLM 130a. Although FIG. 1A illustrates that the LLM 130a and the LLM 130b are external to the document search system 102, in various implementations the LLM 130a and/or the LLM 130b can be internal to the document search system 102.

In the example of FIG. 1A, the user 150 (which generally refers to a computing device of any type that may be operated by a human user) may provide a user input to the document search system 102 indicating a natural language question for some document searching and/or data analysis to be performed. In response to receiving the user input from the user 150, the document search module 106 may search among a set of documents stored in the database module 108 that the user 150 is permitted or authorized to access for identifying portions of the set of documents that are similar to the user input. The document prompt module 110 may then generate a prompt for the LLM 130a and/or 130b based on the user input and the portions of the set of documents that are similar to the user input from the user 150. As such, the document search system 102 can enable natural language searching and response, utilizing the LLM 130a and/or 130b, with references to a large set of documents, without being constrained by a size limit on prompts for the LLM 130a and/or 130b. Additionally, permissioning of data can be respected and the document search system 102 and/or the user 150 can ensure that the LLM 130a and/or 130b only provides, for example, responses that are based on permitted information sources that the user 150 is authorized to access. Further, rather than providing response that may be generic or prone to hallucination, the document search system 102 may enable the LLM 130a and/or 130b to output focused, specific, or on the point responses based on particular information sources not only permissioned to the user 150 but more relevant to the user input.

Example System and Related Modules

Figure 1B:
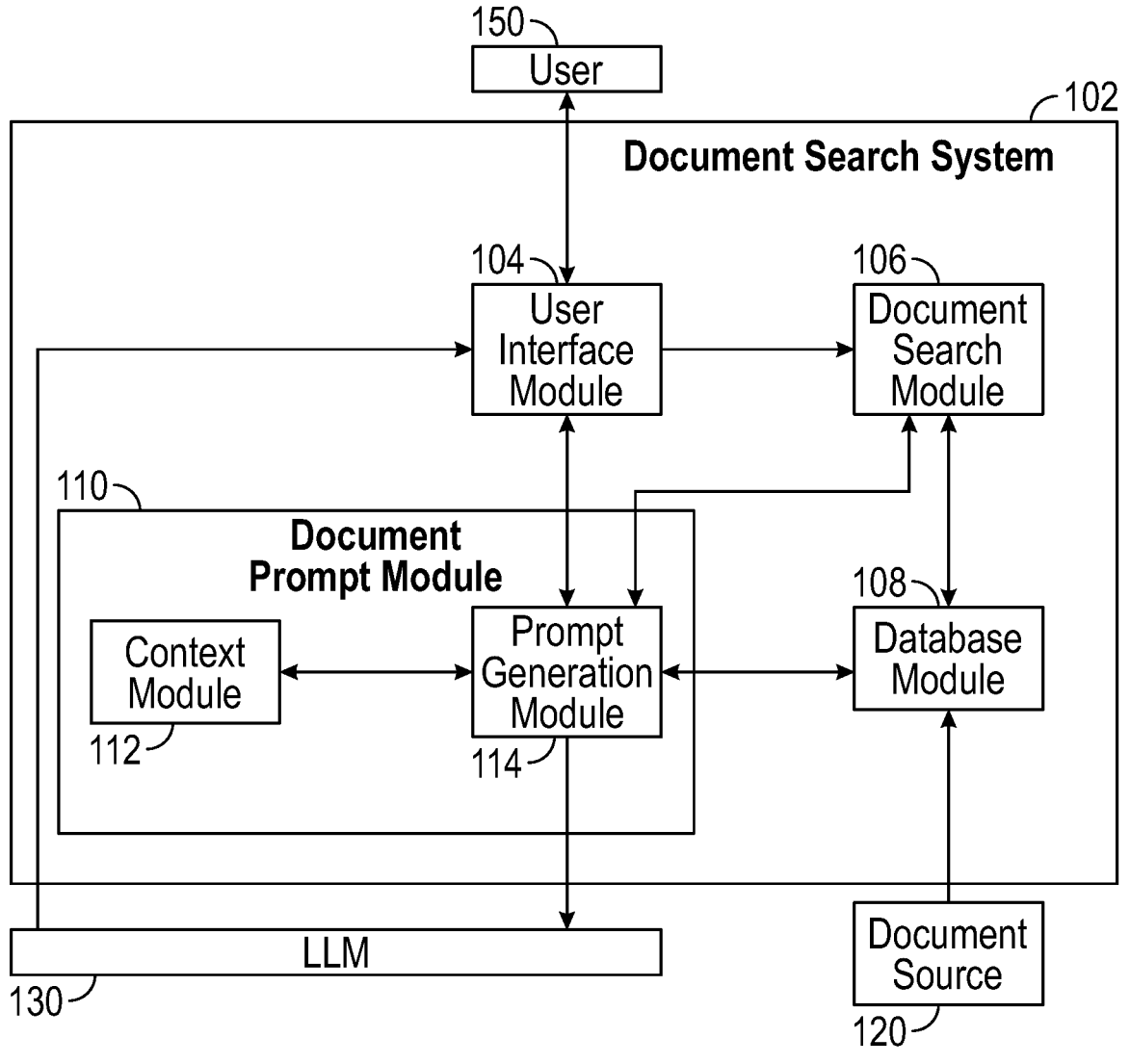
FIG. 1B depicts an example block diagram of the document search system, where the document search system can, for example, enable natural language searching and response, utilizing one or more LLMs, with references to a set of documents, without being constrained by a size limit on prompts for the one or more LLMs, according to various embodiments of the present disclosure.

FIG. 1B depicts example connections between various modules of the document search system 102 of FIG. 1A, including the user interface module 104, the document search module 106, the database module 108, and the document prompt module 110 that includes a context module 112 and a prompt generation module 114. In other embodiments, the document search system 102 may include fewer or additional connections. The indicated connections and/or data flows of FIG. 1B are exemplary of only certain processes performed by the document search system 102 and is not meant to include all possible blocks and participants.

As described above, the user interface module 104 is configured to generate user interface data that may be rendered on the user 150 (which generally refers to a computing device of any type and/or a human user of the device), such as to receive an initial user input, as well as later user input that may be used to initiate further data processing. In various implementations, the functionality discussed with reference to the user interface module 104, and/or any other user interface functionality discussed herein, may be performed by a device or service outside of the document search system 102 and/or the user interface module 104 may be outside the document search system 102. A user 150 may provide a user input to the user interface module 104 indicating a natural language question for some document searching and/or data analysis to be performed.

In response to receiving the user input from the user 150, the document search module 106 may search among a set of documents stored in the database module 108 that the user 150 is permitted or authorized to access for identifying portions of the set of documents that are similar to the user input. As noted above, the set of documents stored in the database module 108 may be obtained from the document source 120 that may be managed by a third-party and/or may be external to the document search system 102. In various implementations, the document search module 106 may chunk, vectorize, normalize (and/or the like) the set of documents in advance (e.g., as a preprocessing operation or before receiving the user input). More specifically, the document search module 106 may extract, clean, and/or chunk a set of documents stored in the database module 108 of the document search system 102 into a plurality of portions/segments of the set of documents. For example, the document search module 106 may chunk documents into a plurality of words, sentences, paragraphs, and/or the like. The text chunks (e.g., the plurality of portions of the set of documents) may be stored in an ontology, or based on an ontology, which may define document/data types and associated properties, and relationships among documents/data types, properties, and/or the like. The document search module 106 may select the granularity (e.g., words, sentences, paragraphs, and/or the like) for chunking documents based on various criterion, such as a size of the set of documents, a type of the set of documents, a type of similarity search as described herein, a user feedback as described herein, and/or the like.

The document search module 106 may further vectorize the text chunks to generate a plurality of vectors, where each of the plurality of vectors corresponds to a chunked portion/ segment (e.g., a word, a sentence, a paragraph, or the like) of the set of documents. Each text chunk and vector may be associated with a reference identification number (ID) and each text chunk and vector as well as an associated reference ID may be stored in the ontology of the document search system 102, where the ontology may be within the database module 108. Further, each vector may be a mathematical representation of semantic content associated with a corresponding chunked portion of the set of documents. The document search module 106 may also vectorize the user input/query into a query vector. In various examples, the document search module 106 may employ a language model such as a LLM (e.g., GPT-2) to vectorize the user input/ query and portions of the set of documents permissioned to the user 150.

Additionally and/or optionally, the document search module 106 may normalize, transform, and/or provide context to the plurality of portion of the set of documents before and/or after vectorizing the plurality of portion of the set of documents. For example, based on the context associated with the user input from the user 150, the document search module 106 may replace a generic phrase (e.g., company) in the plurality of portions of the set of documents into a specific phrase consistent with the context (e.g., a name of a particular company). Advantageously, the normalization, transformation, and/or provisioning of context to the plurality of portions of the set of documents may enable the document search module 106 and/or the LLM 130 to more accurately identify portions of the set of documents that are more relevant to the user query.

Based on the query vector and the plurality of vectors generated from vectorizing portions (e.g., text chunks) of the set of documents permissioned to the user 150, the document search module 106 may execute a similarity search between the query vector and the plurality of vectors to identify one or more documents portions that are more relevant or similar to the user input from the user 150. The document search module 106 may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms. In various examples, the similarity search may yield n most similar portions of the set of documents in light of the user input, where n may be any positive integer. In various examples, n may be 40, 50, 100, 200, or any other positive integers. Additionally and/or alternatively, the similarity search may yield similar document portions having a threshold similarity with the user input. In various examples, the threshold similarity may be adjustable by the document search module 106 or the user 150. Additionally, the similarity search may further return reference IDs of the vectors corresponding to the n most similar portions of the set of documents. The document search module 106 may also store the result of the similarity search in the database module 108 of the document search system 102 using an ontology, or based on an ontology, which may define document/data types and associated properties, and relationships among documents/data types, properties, and/or the like. Advantageously, the returned reference IDs may allow the document search module 106 and/or the document prompt module 110 to more efficiently locate and access the n most similar portions of the set of documents for generating a prompt to the LLM 130 for responding to the user input from the user 150. Depending on the limit on the size of the prompt to the LLM 130 and/or size of the similar portions of the set of documents, the document search module 106 may increase or decrease n to balance system accuracy, performance and efficiency.

Additionally and/or optionally, rather than executing similarity search based on purely literal matching between the query vector and the plurality of vectors, the document search module 106 may effect similarity search based on meanings of the user query and portions of the set of documents. As noted above, the document search module 106 may vectorize chunked portions of the set of documents into mathematical representations of the semantic contents of the chunked portions of the set of documents. As such, the document search module 106 may then execute similarity search to identify portions of the set of documents most similar in meaning to the user query. Advantageously, using portions of the set of documents most similar to the user query semantically to generate a prompt to the LLM 130 may enable the document search system 102 to receive more accurate or desired response from the LLM 130 for the document search system 102 to responding to the user input from the user 150.

Based on the similarity search result that may be stored in the database module 108 using an ontology, the document prompt module 110 may query the ontology to obtain portions of the set of documents similar to the user input. For example, the prompt generation module 114 may query the ontology using the reference IDs of the vectors corresponding to the n most similar portions of the set of documents returned by the similarity search to retrieve/obtain portions of the set of documents similar to the user input. In various examples, the prompt generation module 114 may further retrieve/obtain extended portions of the set of documents that are adjacent to the portions of the set of documents similar to the user input. For example, the extended portions of the set of documents may be include sentences immediately before and/or after sentences of the set of documents that match to the user query, and/or paragraphs in which the sentences of the set of documents that match to the user query are found.

The prompt generation module 114 may then generate a prompt for the LLM 130 based at least on the user input and the portions of the set of documents similar to the user input. The prompt may include the user input and the portions of the set of documents similar to the user input. The prompt generation module 114 may then transmit the prompt to the LLM 130 for the LLM 130 to generate an output. Alternatively and/or optionally, the prompt may include instructions that instruct the LLM 130 to refer to the portions of the set of documents similar to the user input in generating output responsive to the user input. Advantageously, the LLM 130 may refrain from accessing documents impermissible to the user 150 or documents that are irrelevant to the user input, and may generate output based on particular corpus of data that the user 150 is authorized or permitted to access. Additionally and/or optionally, the prompt generation module 114 may generate the prompt based on the user input, the portions of the set of documents similar to the user query, and the extended portions of the set of documents that are adjacent to the portions of the set of documents similar to the user input.

In various examples, the prompt generation module 114 may generate a prompt for the LLM based on a template response if the portions of the set of documents similar to the user input do not provide an answer to the user input or if the prompt generation module 114 determines that the user input is directed toward documents outside scope of permissible documents to the user 150 that submitted the user input. For example, if the portions of the set of documents similar to the user input do not provide an answer to the user input or if the user input relates to sensitive information (e.g., confidential military or regulatory information) about an entity with which the user 150 is unauthorized to access, prompt generation module 114 may generate a prompt that instructs the LLM 130 to generate the template response (e.g., "I don't know," or the like) rather than speculate an answer. As such, the LLM 130 may be prevented from hallucinating a response or generating a response based on a generic or large corpus of data that the LLM 130 was trained on. Advantageously, rather than generating generic responses that are inconsistent with context of the user input, the LLM 130 is more likely to generate responses tailored to context of the user query while preserving data security.

The prompt generation module 114 may generate a prompt for a LLM for responding to a user input further based on a context associated with the user input or a user 150 that submitted the user input. The context associated with the user input or the user 150 may be generated by the context module 112 and may include any information associated with the user 150, user session, or some other characteristics. For example, context may include all or part of a conversation history from one or more sessions with the user 150. Because a typical LLM is stateless (e.g., doesn't remember previous prompts or replies provided to a particular user), generating a prompt for the LLM 130 based on the context in addition to the user input and portions of the set of documents similar to the user input can assist the LLM 130 in generating output that is less prone to hallucination and more likely to meet the expectation of the user 150. To utilize context associated with the user input to generate the prompt for the LLM 130, the context module 112 may capture, synchronize, and/or store context data (e.g., session detail associated with the user query, user information, timestamps of events, previous user queries and responses from the LLM) in data objects (e.g., a session data object as described herein) and/or an ontology stored in the database module 108.

Additionally and/or optionally, the prompt generation module 114 may condense the context when generating the prompt for the LLM 130. Specifically, the prompt generation module 114 may condense the context and/or the prompt such that a size of the prompt generated by the prompt generation module 114 for the LLM 130 does not exceed or overflow a size limit on the prompt for the LLM 130. In various examples, rather than directly incorporating entire conversation history of a user session in which the user input is made, the prompt generation module 114 may generate a context associated with the user input by summarizing the conversation history to condense the prompt to the LLM 130 within the size limit. For example, the prompt generation module 114 may summarize the conversation history using another LLM (not shown in FIG. 1B) or using the LLM 130 to which the prompt is to be transmitted. Advantageously, generating the prompt for the LLM 130 while condensing the prompt enables the prompt generation module 114 to provide the prompt for the LLM 130 that is detailed enough without exceeding a size limit of a prompt window.

Example Database and Data Models

Figure 2A:
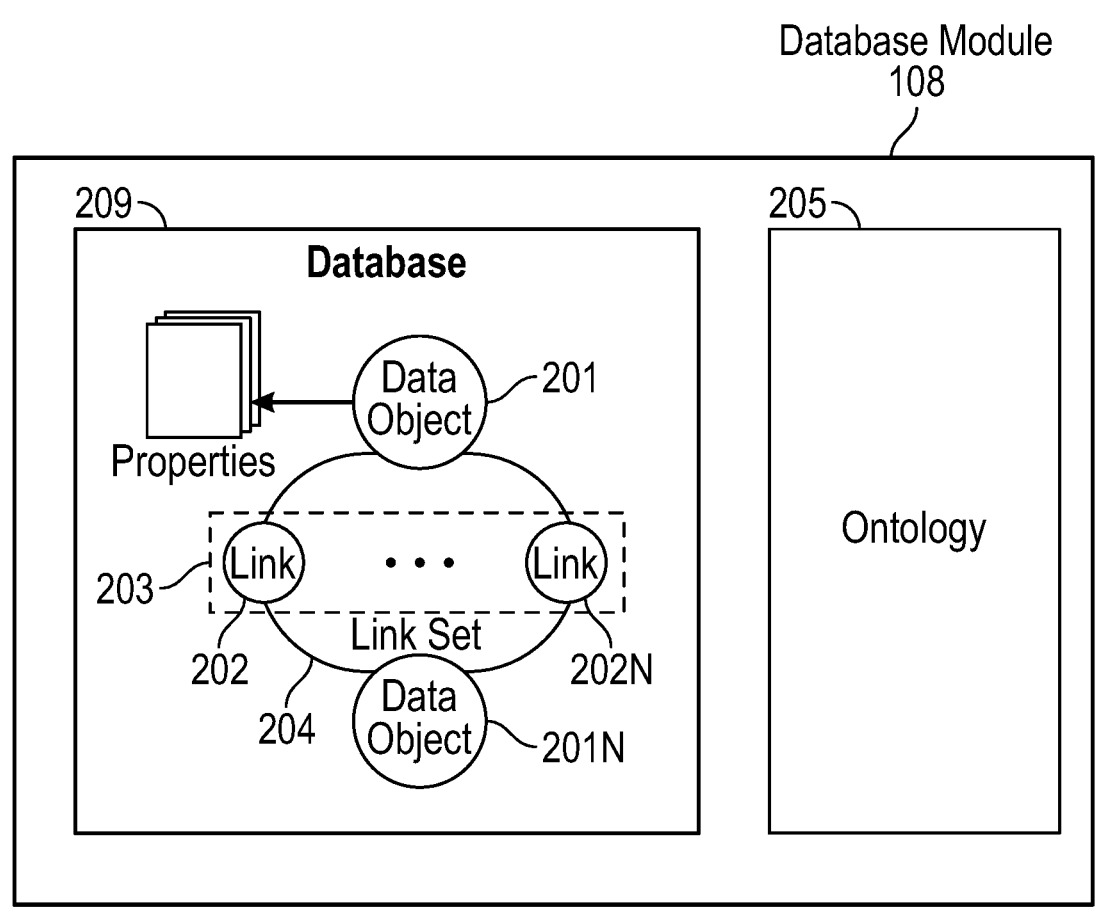
FIG. 2A illustrates an object-centric conceptual data model, according to various embodiments of the present disclosure.

FIG. 2A illustrates an object-centric conceptual data model in the database module 108 of the document search system 102 according to various embodiments of the present disclosure. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, session data object 210 that will be described with greater detail below can represent a user session of the user 150 (e.g., a "session data object"). Data object 201 can also represent a document or other unstructured data source such as an e-mail message, a news report, or a written paper or article. Data object 201 can also represent a query submitted by the user 150 or an answer provided by the document search system 102 to the user 150 in response to the query. Data object 201 can also represent an entity such as a person, a place, an organization, a market instrument, or other noun. Data object 201 can also represent an event that happens at a point in time or for a duration. Each data object 201 is associated with a unique identifier that uniquely identifies the data object within the database module 108.

In various implementations, different types of data objects may have different property types. For example, a "Person" data object might have an "Eye Color" property type and an "Event" data object might have a "Date" property type. Each property 203 as represented by data in the database module 108 may have a property type defined by the ontology 205 used by the database module 108. Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties. Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just various examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document. Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the ontology 205 used by the database 209.

Figure 2B:
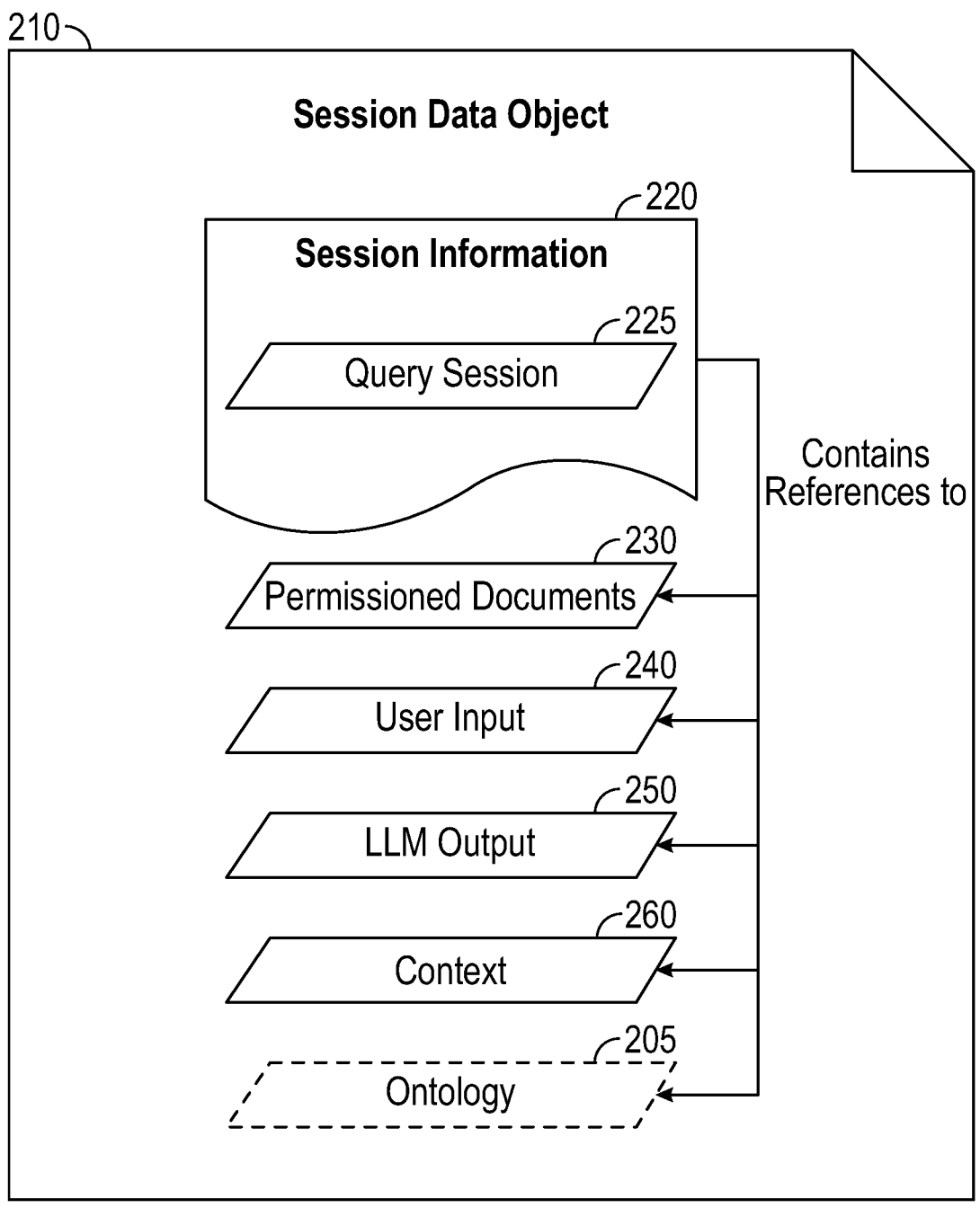
FIG. 2B is a block diagram illustrating an example session data object in accordance with various embodiments of the present disclosure.

FIG. 2B is a block diagram illustrating an example session data object 210 in accordance with various implementations of the present disclosure. As indicated above, the session data object 210 may be stored in the database 209 of the database module 108. In various implementations, the document search system 102 may utilize the session data object 210 to store information and/or data associated with a user session of the user 150 in the database module 108 of the document search system 102 for various purposes. The session data object 210 may include data objects or may be linked to data object(s) that represent documents, unstructured data sources, timestamps of events (e.g., when one or more user queries of the user are received and/or responded), profiles of the user 150, or the like that are associated with the user session. For example, queries of the user 150 and/or history of answers (including, but not limited to, who asked a particular question, what answer was provided to the particular question, and based on which document(s) the answer was generated) can be stored by the document search system 102 using the session data object 210 and/or data objects 201 associated with the session data object 210 for later auditing.

As illustrated in FIG. 2B, the session data object 210 may comprise several distinct elements associated with a query session 225 of the user 150, such as indications of permissioned documents 230 (e.g., a set of documents permissioned to the user 150), user input 240 from the user 150, LLM output 250 (e.g., output from the LLM 130 that answers the user input 240), and/or context 260 associated with the user input 240 that is generated by the context module 112. In various implementations, the session data object 210 may further indicate an ontology 205. The session data object 210 may further include session information 220 that includes the query session 225 within which the user 150 made the user input 240. The session information 220 may include timestamps of events of the query session 225, profile information of the user 150, and/or the like.

The session information 220 may include references to one or more of permissioned documents 230, user input 240, LLM output 250, context 260 and/or ontology 205. For example, session information 220 may: (1) identify permissioned documents 230 that the document search module 106 may search to identify portions of a set of documents that are similar to the user input 240; (2) identify user input 240 that may be submitted by the user 150; (3) identify LLM output 250 that may be generated by the LLM 130 in response to receiving a prompt generated by the prompt generation module 114; and/or (4) identify ontology 205 that the LLM 130 may traverse in fulfilling a user input 240.

As noted above, the document search system 102 may utilize the session data object 210 and/or additional data objects to automatically generate research reports for compliance or regulatory reviews, detecting out of policy use, or other purposes. Advantageously, session data objects 210 stored in the database module 108 of the document search system 102 may enable information associated with the user session to be easily auditable. For example, the document search system 102 may further utilize information stored using the session data object 210 and/or other data objects to evaluate if the LLM 130 hallucinate or if the LLM 130 accesses documents or data sources the user 150 that submitted a user input is not permitted to access.

Example System Functionality and Interactions of Related Aspects

Figure 3A:
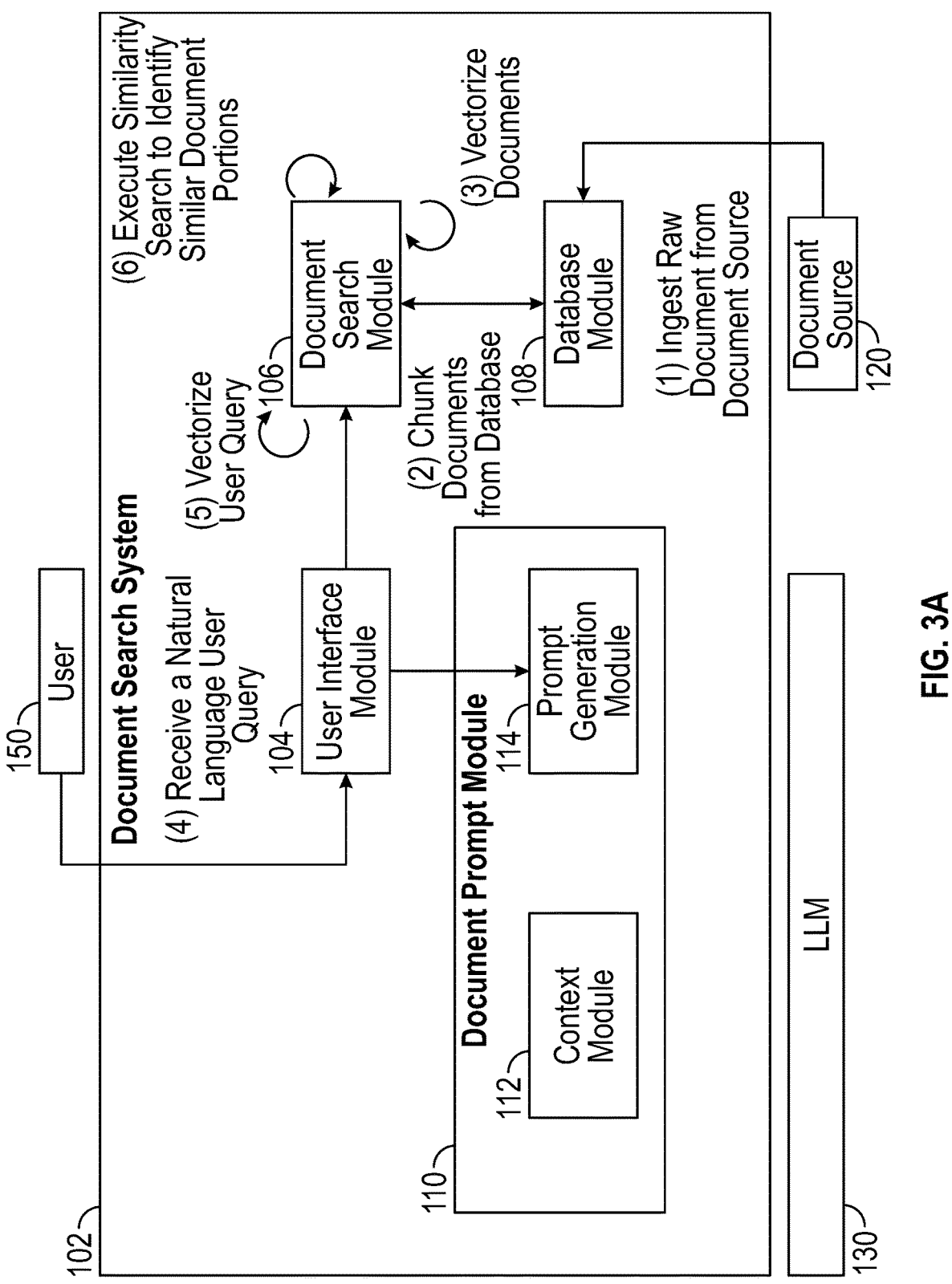
FIGS. 3A-3B depict example interactions for enabling natural language searching and response, using a LLM, with references to a set of documents on the document search system, according to various embodiments of the present disclosure.
Figure 3B:
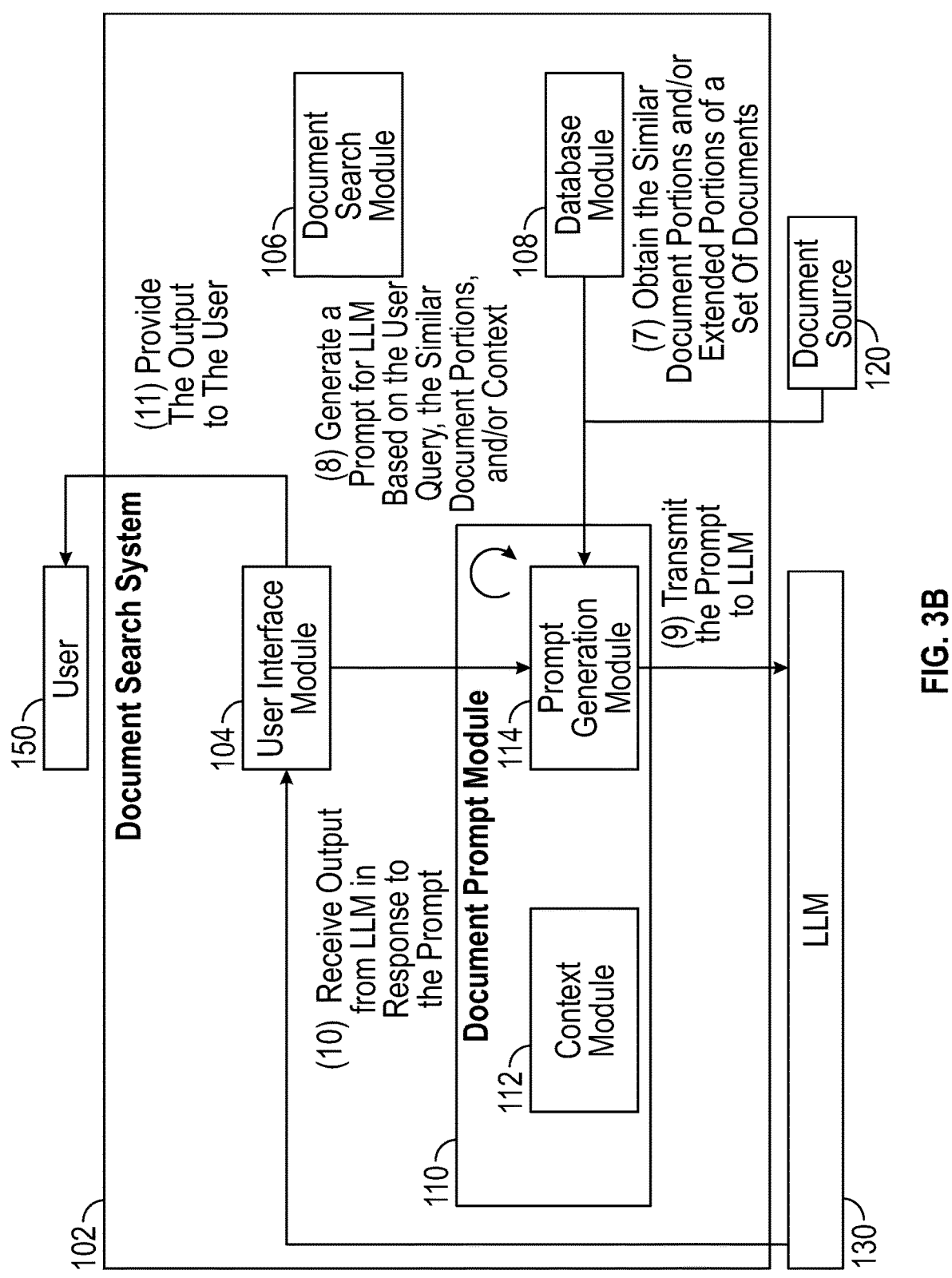

With reference to FIGS. 3A-3B, illustrative interactions will be described depicting how elements of the document search system 102 of FIGS. 1A-1B (e.g., the user interface module 104, the document search module 106, the database module 108, and the document prompt module 110) can employ one or more LLMs (e.g., the LLM 130) for searching a large corpus of data (e.g., a set of documents) while also respecting security and/or permissioning of users, systems, data, and/or the like. Specifically, FIGS. 3A-3B depict illustrative interactions among various modules of the document search system 102 of FIGS. 1A-1B to search among a set of documents that the user 150 is permitted or authorized to access for texts relevant to a user query from the user 150, and generate a prompt for the LLM 130 based on results of the search.

The interactions of FIG. 3A begin at (1), where the database module 108 may ingest raw documents from the document source 120. As noted above, data and/or documents that may be queried by the user 150 can be obtained from the document source 120 (e.g., a third-party or data source external to the document search system 102) and stored in the database module 108 of the document search system 102 using the ontology 205, or based on the ontology 205, which may define document/data types and associated properties, and relationships among documents/data types, properties, and/or the like. In various examples, a user query may be a natural language query, and the document search system 102 is expected to return a natural language output responsive to the natural language query.

Next, at (2), the document search module 106 may chunk a set of documents stored in the database module 108 into a plurality of portions/segments of the set of documents. For example, the document search module 106 may chunk documents into a plurality of words, sentences, paragraphs, and/or the like. The text chunks (e.g., the plurality of portions of the set of documents) may be stored in the ontology 205, or based on the ontology 205. The document search module 106 may select the granularity (e.g., words, sentences, paragraphs, and/or the like) for chunking documents based on various criterion, such as a size of the set of documents, a type of the set of documents, a type of similarity search as described herein, a user feedback as described herein, and/or the like.

Then, at (3), the document search module 106 may further vectorize the text chunks to generate a plurality of vectors, where each of the plurality of vectors corresponds to a chunked portion/segment (e.g., a word, a sentence, a paragraph, or the like) of the set of documents. Each text chunk and vector may be associated with a reference identification number (ID) and each text chunk and vector as well as an associated reference ID may be stored in the ontology 205 of the database module 108 as noted above. Further, each vector may be a mathematical representation of semantic content associated with a corresponding chunked portion of the set of documents.

Thereafter, at (4), the user interface module 104 may receive, from the user 150, a natural language user query. The user 150 may provide the natural language user query to the user interface module 104 indicating a natural language question for some document searching and/or data analysis to be performed by the LLM 130 and/or the document search system 102.

In various implementations, the document search module 106 may chunk and/or vectorize the set of documents as described at (2) and (3) in advance (e.g., as a preprocessing operation or before receiving the natural language user query at (4)). Alternatively, the document search module 106 may chunk and/or vectorize the set of documents as described at (2) and (3) in real-time (e.g., chunking, vectorizing, and/or the like, based on a subset of the natural language user query received at (4) or a user operation directed toward the user interface module 104).

At (5), the document search module 106 may vectorize the natural language user query. More specifically, The document search module 106 may vectorize the natural language user query into a query vector. In various examples, the document search module 106 may employ a language model such as a LLM different from or the same as the LLM 130 to vectorize the natural language user query.

Although not illustrated in FIG. 3A, the document search module 106 may optionally normalize, transform, and/or provide context to a plurality of portion of the set of documents before and/or after vectorizing the set of documents at (3). For example, based on the context associated with the user query, the document search module 106 may replace a generic phrase (e.g., company) in the plurality of portions of the set of documents into a specific phrase consistent with the context (e.g., a name of a particular company). Advantageously, the normalization, transformation, and/or provisioning of context to the plurality of portions of the set of documents may enable the document search system 102 (including the LLM 130) to more accurately identify portions of the set of documents that are more relevant to the user query from the user 150.

At (6), the document search module 106 may execute a similarity search between the query vector generated at (5)

and the plurality of vectors generated at (3) to identify one or more documents portions that are more relevant or similar to the natural language user query received at (4). As noted above, at (6), the document search module 106 may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms.

In various examples, the similarity search may yield n most similar portions of the set of documents in light of the user query, where n may be any positive integer. In various examples, n may be 40, 50, 100, 200, or any other positive integers. Additionally and/or alternatively, the similarity search may yield similar document portions having a threshold similarity with the first user input. In various examples, the threshold similarity may be adjustable by the system or a user. Additionally, the similarity search may further return reference IDs of the vectors corresponding to the n most similar portions of the set of documents. The document search module 106 may also store the result of the similarity search in the database module 108 using the ontology 205, or based on the ontology 205. As will be described at (7), the returned reference IDs may allow the document prompt module 110 to more efficiently locate and access the n most similar portions of the set of documents for generating a prompt to the LLM 130 for responding to the user query. Depending on the limit on the size of the prompt to the LLM 130 and/or size of the similar portions of the set of documents, the document search module 106 may increase or decrease n to balance system accuracy, performance and efficiency.

At (6), rather than executing similarity search based on purely literal matching between the query vector and the plurality of vectors, the document search module 106 may effect similarity search based on meanings of the user query and portions of the set of documents. As noted above, the document search module 106 may vectorize chunked portions of the set of documents into mathematical representations of the semantic contents of the chunked portions of the set of documents. As such, the document search module 106 may execute similarity search to identify portions of the set of documents most similar in meaning to the user query. Advantageously, using portions of the set of documents most similar to the user query semantically to generate a prompt to a LLM that will be described at (8) may enable the document search system 102 to receive more accurate or desired response from the LLM 130 for the system to responding to the user query from the user 150.

With reference now to FIG. 3B, at (7), the prompt generation module 114 may obtain the similar documents portions from the database module 108. For example, the prompt generation module 114 may query the ontology 205 using the reference IDs of the vectors corresponding to the n most similar portions of the set of documents returned by the similarity search to retrieve/obtain portions of the set of documents similar to the user query.

Optionally, the prompt generation module 114 may further retrieve/obtain extended portions of the set of documents that are adjacent to the portions of the set of documents similar to the user query. For example, the extended portions of the set of documents may include sentences immediately before and/or after sentences of the set of documents that match to the user query, and/or paragraphs in which the sentences of the set of documents that match to the user query are found. In various implementations, the prompt generation module 114 may retrieve/obtain the extended portions of the set of documents from the database module 108 and/or the document source 120.

At (8), the prompt generation module 114 may generate a prompt for the LLM 130 based at least on the user query and the portions of the set of documents similar to the user query. The prompt may include the user query and the portions of the set of documents similar to the user query. Alternatively and/or optionally, the prompt may include instructions that instruct the LLM to refer to the portions of the set of documents similar to the user query in generating output responsive to the user query. As such, the LLM 130 may refrain from accessing documents impermissible to the user 150 or documents that are irrelevant to the user query, and may generate output based on particular corpus of data that the user 150 is authorized or permitted to access.

Additionally and/or optionally, the prompt generation module 114 may generate a prompt for the LLM 130 further based on a context associated with the user query or the user 150. The context associated with the user input or the user 150 may be generated by the context module 112 and may include any information associated with the user 150, a user session, or some other characteristics. For example, context may include all or part of a conversation history from one or more sessions with the user 150. Because a typical LLM is stateless (e.g., doesn't remember previous prompts or replies provided to a particular user), generating a prompt for the LLM 130 based on the context in addition to the user input and portions of the set of documents similar to the user input can assist the LLM 130 in generating output that is less prone to hallucination and more likely to meet the expectation of the user 150. To utilize context associated with the user input to generate the prompt for the LLM 130, the context module 112 may capture, synchronize, and/or store context data (e.g., session detail associated with the user query, user information, timestamps of events, previous user queries and responses from the LLM) in data objects (e.g., a session data object 210 and/or data object 201) and/or the ontology 205 stored in the database module 108.

Additionally and/or optionally, at (8), the prompt generation module 114 may condense the context when generating the prompt for the LLM 130. Specifically, the prompt generation module 114 may condense the context and/or the prompt such that a size of the prompt generated by the prompt generation module 114 for the LLM 130 does not exceed or overflow a size limit on the prompt for the LLM 130. In various examples, rather than directly incorporating entire conversation history of a user session in which the user input is made, the prompt generation module 114 may generate a context associated with the user input by summarizing the conversation history to condense the prompt to the LLM 130 within the size limit. For example, the prompt generation module 114 may summarize the conversation history using another LLM (not shown in FIG. 1B) or using the LLM 130 to which the prompt is to be transmitted. Advantageously, generating the prompt for the LLM 130 while condensing the prompt enables the prompt generation module 114 to provide the prompt for the LLM 130 that is detailed enough without exceeding a size limit of a prompt window.

Optionally, at (8), the prompt generation module 114 may generate the prompt based on the user query, the portions of the set of documents similar to the user query, the context, and the extended portions of the set of documents that are adjacent to the portions of the set of documents similar to the user query that may be obtained at (7).

At (9), the prompt generation module 114 may transmit the prompt to the LLM 130 for the LLM 130 to generate an output. As noted above, the LLM 130 may be a QA (question and answer) LLM that is trained to generate answers from user queries. In various implementations, the LLM 130 may be locally hosted by the document search system 102, cloud managed, accessed via one or more Application Programming Interfaces ("APIs"), and/or any combination of the foregoing and/or the like. Data that may be queried using the LLM 130 may include any type of electronic data, such as text, files, documents, books, manuals, emails, images, audio, video, databases, metadata, positional data (e.g., geo-coordinates), sensor data, web pages, time series data, and/or any combination of the foregoing and/or the like. Such data may be permissioned and/or have security information associated with it at any level of granularity.

At (10), the document search system 102 may receive an output from the LLM 130 in response to the prompt generated at (8) and transmitted at (9). More specifically, the user interface module 104 may receive the output from the LLM 130 in response to the prompt.

At (11), the user interface module 104 may provide the output from the LLM 130 to the user 150. More features associated with the user interface module 104 will be described below with references to FIGS. 7-11.

Although not illustrated in FIGS. 3A-3B, the document search system 102 may provide the flexibility of easily swapping between various language models employed by the document search system 102 to provide various services. For example, the system may swap the LLM 130 using other LLMs (e.g., switching between GPT-3 to GPT-4) for generating answers based on user queries. Such model swapping flexibility provided by the document search system 102 may be beneficial in various aspects, such as experimentation and adaptation to different models based on specific use cases or requirements, providing versatility and scalability associated with services rendered by the system. Through interactions among modules of the document search system 102 as described herein, the document search system 102 can enable the LLM 130 to search a large corpus of data relevant to user queries while simultaneously avoid providing impermissible documents to the LLM 130, thus advantageously facilitating effective search on large corpus of documents and helping preserve confidentiality of sensitive information.

Further Example Functionality and Operations of the System

FIGS. 4, 5, and 6 show flowcharts illustrating example operations of the document search system 102 (and/or various other aspects of the example computing environment 100), according to various embodiments. The blocks of the flowcharts illustrate example implementations, and in various other implementations various blocks may be rearranged, optional, and/or omitted, and/or additional block may be added. In various embodiments, the example operations of the system illustrated in FIGS. 4, 5 and 6 may be implemented, for example, by the one or more aspects of the document search system 102, various other aspects of the example computing environment 100, and/or the like.

FIG. 4 depicts a flowchart illustrating an example method 400 according to various embodiments. The method 400 may be implemented, for example, by the document search system 102 of FIGS. 1A and 1B to enable natural language searching and response, utilizing one or more LLMs (e.g., LLM 130a, 130b, 130), with references to a large set of documents, without being constrained by a size limit on prompts for the one or more LLMs.

At block 402, the document search system 102 may receive, from a user via a user interface, a first user input including a natural language query. For example, the user interface module 104 may receive the first user input for the LLM 130 from the user 150. The user 150 may provide the first user input to the user interface module 104 indicating a natural language question for some document searching and/or data analysis to be performed by the LLM 130 and/or the document search system 102. The user 150 may further select through the user interface module 104 one or more tools, one or more set of documents and/or object types to limit processing by the document search system 102 and/or the LLM 130.

At block 404, the document search system 102 may vectorize the first user input into a query vector. More specifically, the document search module 106 may vectorize the first user input into a query vector. In various examples, the document search module 106 may employ a language model such as a LLM that is different from the LLM 130 to vectorize the first user input.

At block 406, the document search module 106 may execute, using the query vector generated at block 404, a similarity search in a document search model to identify one or more similar document portions. As noted above, the document search module 106 may execute the similarity search using one of the cosine similarity search, approximate nearing neighbor (ANN) algorithms, k nearest neighbors (KNN) method, locality sensitive hashing (LSH), range queries, or any other vector clustering and/or similarity search algorithms. The similarity search may yield n most similar portions of the set of documents in light of the query vector, where n may be any positive integer.

At block 407, the document search system 102 may obtain similar document portions from a database. For example, the document search module 106 may obtain similar document portions from the database module 108. Optionally, the document search module 106 may further obtain extended document portions that are adjacent to the similar document portions. More specifically, the extended document portions may include sentences immediately before and/or after sentences of a set of documents that match to the user query, and/or paragraphs in which the sentences of the set of documents that match to the user query are found.

Optionally, at block 408, the document search system 102 may generate a context associated with the first user input received at block 402. More specifically, the context module 112 may generate the context associated with the first user input to include any information associated with the user 150, a user session, or some other characteristics. For example, context may include all or part of a conversation history from one or more sessions with the user 150.

If the context associated with the first user input is generated by the context module 112 at block 408, the prompt generation module 114 may obtain the context associated with the first user input at block 410. Otherwise, the method 400 may proceed from block 407 to block 412.

At block 412, the prompt generation module 114 may generate a first prompt for the LLM 130, where the first prompt may include the first user input and/or the similar document portions. Additionally and/or optionally, the prompt generation module 114 may generate the first prompt for the LLM 130 further based on the context associated with the user query or the user 150 that may be optionally generated at block 408. Because a typical LLM is stateless (e.g., doesn't remember previous prompts or replies provided to a particular user), generating a prompt for the LLM 130 based on the context in addition to the first user input and the similar document portions can assist the LLM 130 in generating output that is less prone to hallucination and more likely to meet the expectation of the user 150.

At block 414, the document search system 102 may transmit the first prompt to the LLM 130. More specifically, the prompt generation module 114 may transmit the first prompt to the LLM 130.

At block 416, the document search system 102 may receive a first output from the LLM 130 in response to the first prompt transmitted to the LLM 130 at block 414. More specifically, the user interface module 104 may receive the first output from the LLM 130 in response to the first prompt.

At block 418, the user interface module 104 may provide the first output to the user 150. Optionally and additionally, the user interface module 104 may provide the similar document portions to the user 150 for preview, and may provide a graphical representation of the first output from the LLM 130 to the user 150.

The method 400 may further optionally proceed to block 420, where the document search system 102 may generate a session data object for a query session of the user 150. As noted above, the session data object may include data objects or may be linked to data object(s) that represent documents, unstructured data sources, timestamps of events (e.g., when one or more user queries of the user 150 are received and/or responded), profiles of the user 150, or the like that are associated with the user session under which the first user input is received. Advantageously, session data objects stored in the database (e.g., the database module 108) of the document search system 102 may enable information associated with the user session of the user 150 to be easily auditable. The system may further utilize information stored using the session data object and/or other data objects to evaluate if the LLM 130 hallucinate or if the LLM 130 accesses documents or data sources the user 150 is not permitted to access.

FIG. 5 is a flowchart illustrating an example method 500 for generating the document search model utilized at block 406 of FIG. 4 according to various embodiments. In various implementations, the method 500 may be performed in part or in full by the document search system 102, such as the document search module 106. In various implementations, the method 500 may be performed by the document search system 102 before a user input/query is received by the document search system 102 at block 402 of FIG. 4. Alternatively and/or optionally, the method 500 may be performed by the document search system 102 in response to receiving the user input/query.

At block 502, the document search system 102 may chunk documents of a set of documents in a plurality of portion of the set of documents. More specifically, the document search module 106 may extract, clean, and/or chunk a set of documents stored in the database module 108 into a plurality of portions/segments of the set of documents. For example, the document search module 106 may chunk documents into a plurality of words, sentences, paragraphs, and/or the like. The text chunks (e.g., the plurality of portions of the set of documents) may be stored in the ontology 205, or based on the ontology 205, which may define document/data types and associated properties, and relationships among documents/data types, properties, and/or the like. The document search module 106 may select the granularity (e.g., words, sentences, paragraphs, and/or the like) for chunking documents based on various criterion, such as a size of the set of documents, a type of the set of documents, a type of similarity search as described above, a user feedback from the user 150, and/or the like.

Optionally, at block 504, the document search module 106 may normalize, transform, and/or provide context to the plurality of portion of the set of documents. For example, based on the context associated with a user input/query, the document search module 106 may replace a generic phrase (e.g., company) in the plurality of portions of the set of documents into a specific phrase consistent with the context (e.g., a name of a particular company). Advantageously, the normalization, transformation, and/or provisioning of context to the plurality of portions of the set of documents may enable the document search system 102 (including the LLM 130) to more accurately identify portions of the set of documents that are more relevant to the user input/query.

At block 506, the document search module 106 may vectorize the portions of the set of documents to generate a plurality of vectors. Although not illustrated in FIG. 5, the plurality of vectors and a query vector generated from the user input/query may be further utilized by the document search module 106 to execute a similarity search (e.g., the similarity search executed at block 406 of FIG. 4). More specifically, the document search module 106 may execute the similarity search between the query vector and the plurality of vectors to identify one or more documents portions that are more relevant or similar to the user query. The one or more documents portions that are more relevant or similar to the user query along with the user input/query may be further utilized by the prompt generation module 114 to generate a prompt for the LLM 130 (e.g., generating the first prompt for the LLM 130 at block 412 of FIG. 4).

FIG. 6 is an example flowchart depicting an example method 600 for generating training data based on user feedback from a user (e.g., the user 150) to train one or more LLMs associated with the document search system 102 of FIG. 1A or FIG. 1B in accordance with various implementations of the present disclosure.

At block 602, the document search system 102 may receive, from a user via a user interface, a user feedback related to an output from a LLM. For example, the document search system 102 may receive, from the user 150 via the user interface module 104, a user feedback related to an output from the LLM 130.

At block 604, the document search system 102 may generate training data and/or updated prompt based at least on the user feedback. For example, based on the user feedback, the prompt generation module 114 may generate training data and/or updated prompt to the LLM 130 for the LLM 130 to provide an updated output that may fulfill expectation of the user 150.

Optionally, at block 606, the document search system 102 may train one or more LLMs using the training data. For example, the document search system 102 may train the LLM 130 using the training data.

Example User Interfaces and Related Functionality

FIGS. 7-11 show example user interfaces that illustrates employing LLM(s) for searching a large corpus of data that may be performed by the document search system 102 of FIGS. 1A, 1B, 3A and 3B. The example user interfaces may be presented through the user interface module 104 of the document search system 102 or a user interface of the user 150. The example user interfaces may allow the user 150 to interact with the document search system 102, and may receive a user query from the user 150 for the LLM 130 or provide output from the LLM 130.

In various implementations, in addition to providing the output from the LLM 130, the example user interfaces may provide the portions of a set of documents similar to the user query for the user 150 to preview such that the user 150 may have a better understanding about the basis of the output from the LLM 130. Additionally and/or optionally, the example user interfaces may provide a graphical representation of the output from the LLM 130 to enhance user experience.

In various implementations, the example user interfaces may allow the user 150 to provide feedback to the LLM 130 after processing is complete. In various implementations, the feedback may indicate whether the output of the LLM's processing was a correct or acceptable result given the user query. Additionally and optionally, the user 150 may configure the document search system 102 and/or the LLM 130 through manipulating the example user interfaces. For example, the user 150 may adjust the granularity for chunking documents and vectorizing chunked texts.

Figure 7:
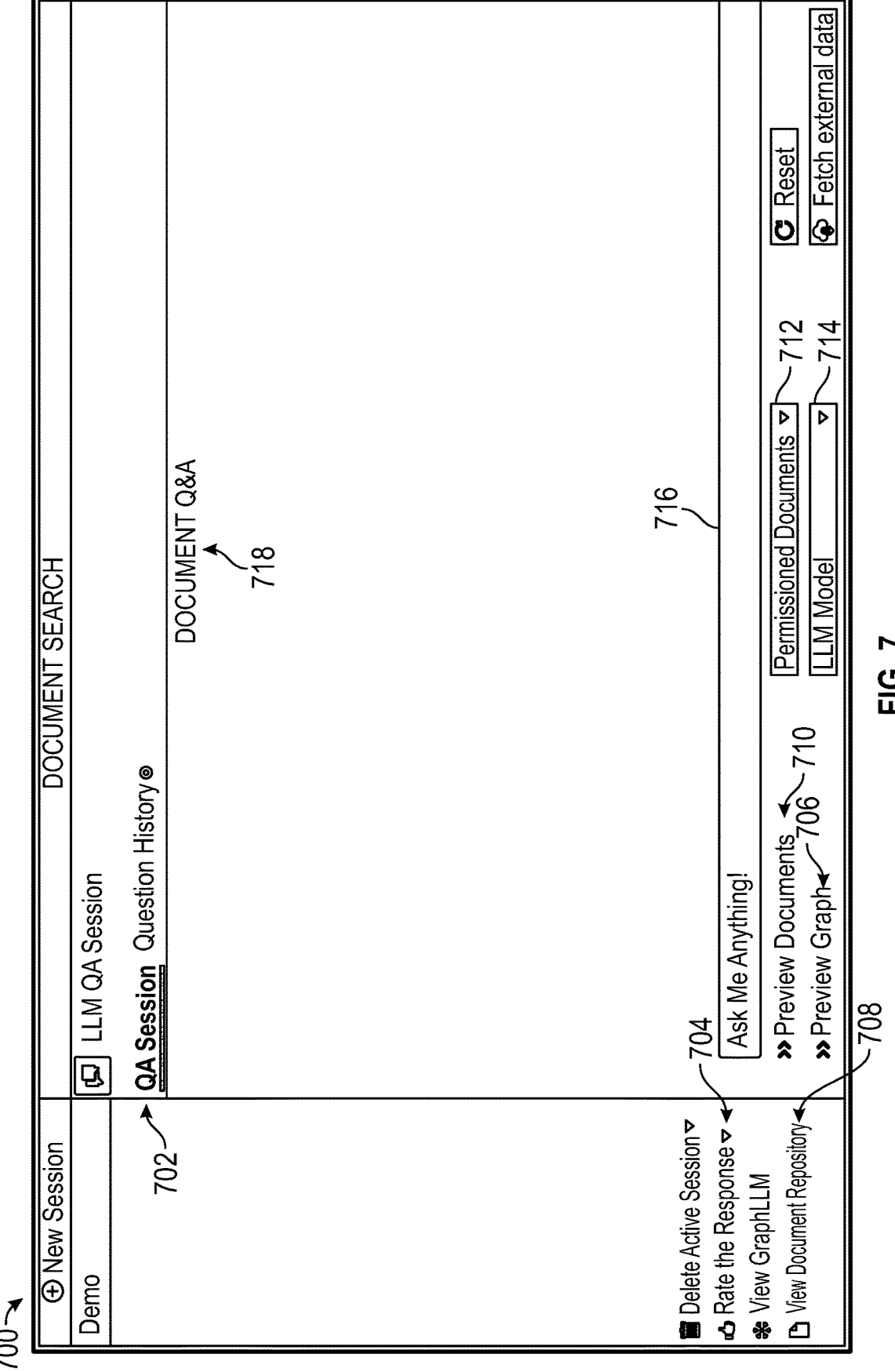
FIGS. 7, 8, 9, 10, and 11 are illustrations of example user interfaces of the document search system, according to various embodiments of the present disclosure.

As shown in FIG. 7, the user interface 700 may include a display portion 702 that shows a session (e.g., "QA Session") the user 150 can operate under to submit user queries. The user interface 700 further shows a heading 718 that shows a title associated with the session the user 150 may be operating. Here, the heading 718 states "DOCUMENT Q&A" to suggest that the user 150 may ask questions that may be answered based on a set of documents. Specifically, the user 150 may enter questions into the message portion 716 of the user interface 700. In various implementations, the document search system 102 may utilize a session data object, such as the session data object 210, to store information associated with the session (e.g., "QA Session") that is displayed in the display portion 702. The session data object may be linked to various data object, such as the data object 201 and data object 201N, that may represent documents, unstructured data sources, timestamps of events (e.g., when one or more user queries of the user are received and/or responded), profiles of the user, or other information that are associated with the session (e.g., "QA Session").

Under the message portion 716 are the menu 712 and menu 714. The menu 712 allows the user 150 to select a particular set of documents or a particular corpus of data for the LLM 130 to search to respond a user query submitted by the user 150. Here, the menu 712 shows "Permissioned Documents," indicating that the document search system 102 and/or the LLM 130 may only search documents/data permissioned to the user 150 for answering the user query. The menu 714 allows the user 150 to select a particular language model for searching the corpus of data identified by menu 712 to answer the user query. Here, the menu 714 shows "LLM Model," that may be various LLM models such as GPT-2, GPT-3, or GPT-4.

As will be described below with greater detail, the user interface 700 further shows a button 710 and a button 706 under the message portion 716. The button 710, if pressed by the user 150, may allow the user 150 to preview documents based on which the LLM 130 answers a user query from the user 150. The user 150 may press the button 706 to view a graphical representation of an output from the LLM 130.

The user interface 700 also includes a button 704 that may allow the user 150 to provide feedback to the document search system 102 and/or the LLM 130. Here, the button 704 reads "Rate the Response." The user interface 700 may further include a button 708 that allows the user 150 to view the document repository maintained by the document search system 102. It should be noted that only corpus of data permissioned to the user 150 may be viewed by the user 150 through operating on the button 708.

Figure 8:
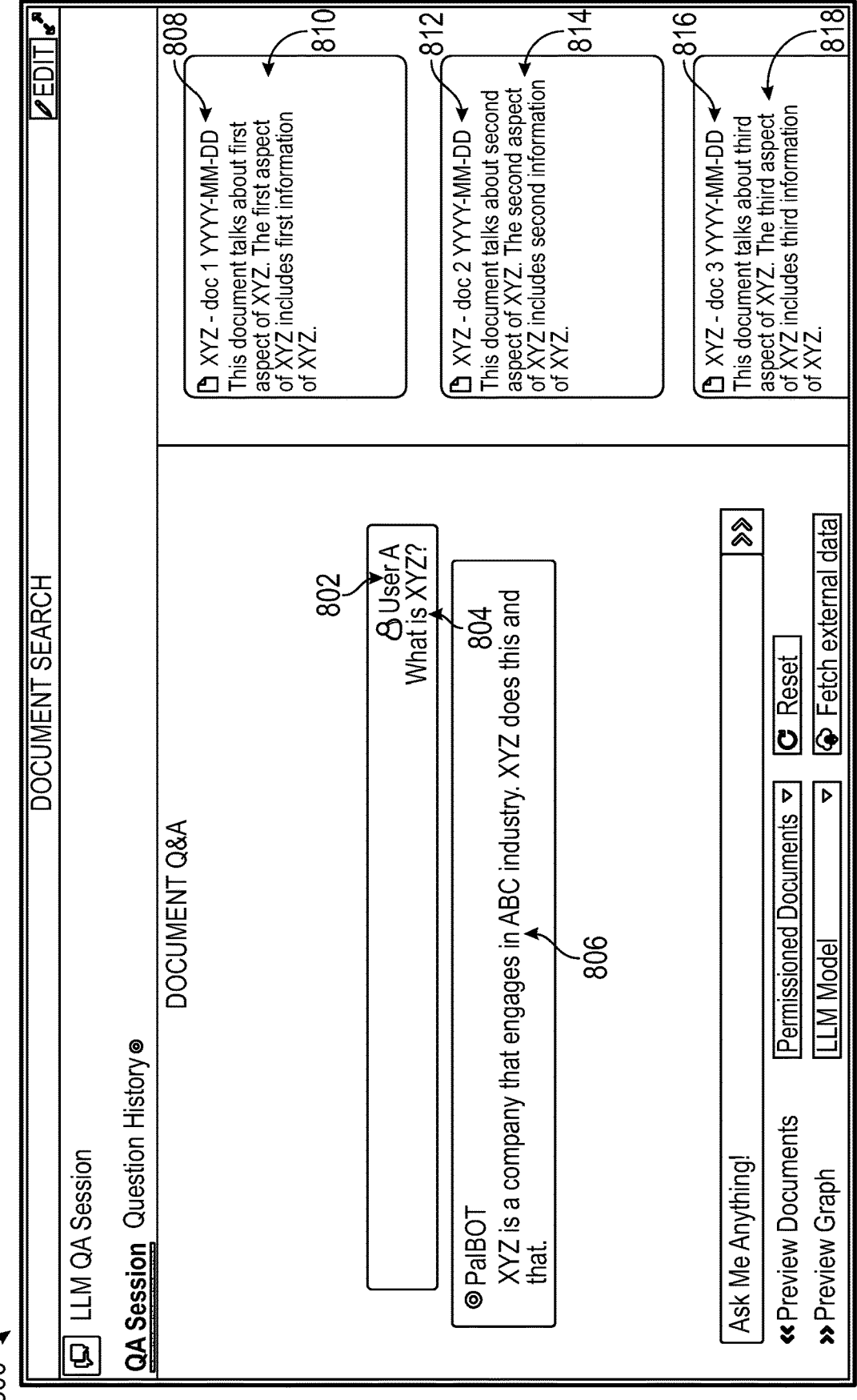

FIG. 8 shows an example user interface 800 that may receive a user query from the user 150 and provide an answer in response to the user query. The user interface 800 shows a display portion 802 that may display a name of the user 150. Here, the display portion 802 states "User A." Under the display portion 802 is the display portion 804 that shows the query the user 150 submits to the document search system 102 and/or the LLM 130. Here, the user 150 asks the question "What is XYZ?", where XYZ may be an entity (e.g., a company).

In response to the query that is shown in the display portion 804, the user interface 800 may provide an answer to the query through the message portion 806. Here, the message portion 806 reads that "XYZ is a company that engages in ABC industry. XYZ does this and that." As noted above, the answer displayed in the message portion 806 may be based on documents that the user 150 is permitted to access and that is shown in the menu 712. As such, rather than providing an answer that may be generic or prone to hallucination, the answer shown in the message portion 806 may be more focused, specific, or on the point based on particular set of documents that the user 150 is permitted to access.

Additionally, the user interface 800 may further show the document title 808, the document content 810, the document title 812, the document content 814, the document title 816 and the document content 818 that display the basis utilized by the document search system 102 and/or the LLM 130 to respond to the user query from the user 150. As shown in FIG. 8, the document title 808 reads "XYZ-doc 1 YYYY-MM-DD" to indicate the date associated with a first document associated with the XYZ company. The user interface 800 further shows the content of the first document associated with the XYZ company using the document content 810. Here, the document content 810 states "This document talks about first aspect of XYZ. The first aspect of XYZ includes first information of XYZ." The document title 812 reads "XYZ-doc 2 YYYY-MM-DD" to indicate the date associated with a second document associated with the XYZ company. The user interface 800 further shows the content of the second document associated with the XYZ company using the document content 814. Here, the document content 814 states "This document talks about second aspect of XYZ. The second aspect of XYZ includes second information of XYZ." The document title 816 reads "XYZ-doc 3 YYYY-MM-DD" to indicate the date associated with a third document associated with the XYZ company. The user interface 800 further shows the content of the third document associated with the XYZ company using the document content 818. Here, the document content 818 states "This document talks about third aspect of XYZ. The third aspect of XYZ includes second information of XYZ."

Although not illustrated in the user interface 800, other document tiles and/or document contents that may be similar to the user query from the user 150 and/or utilized by the LLM 130 to provide the answer in the message portion 806 may also be displayed through the user interface 800. In various implementations, the user interface 800 may display n most similar portions of a set of documents for the user 150 to preview, where n being any positive integer.

Figure 9:
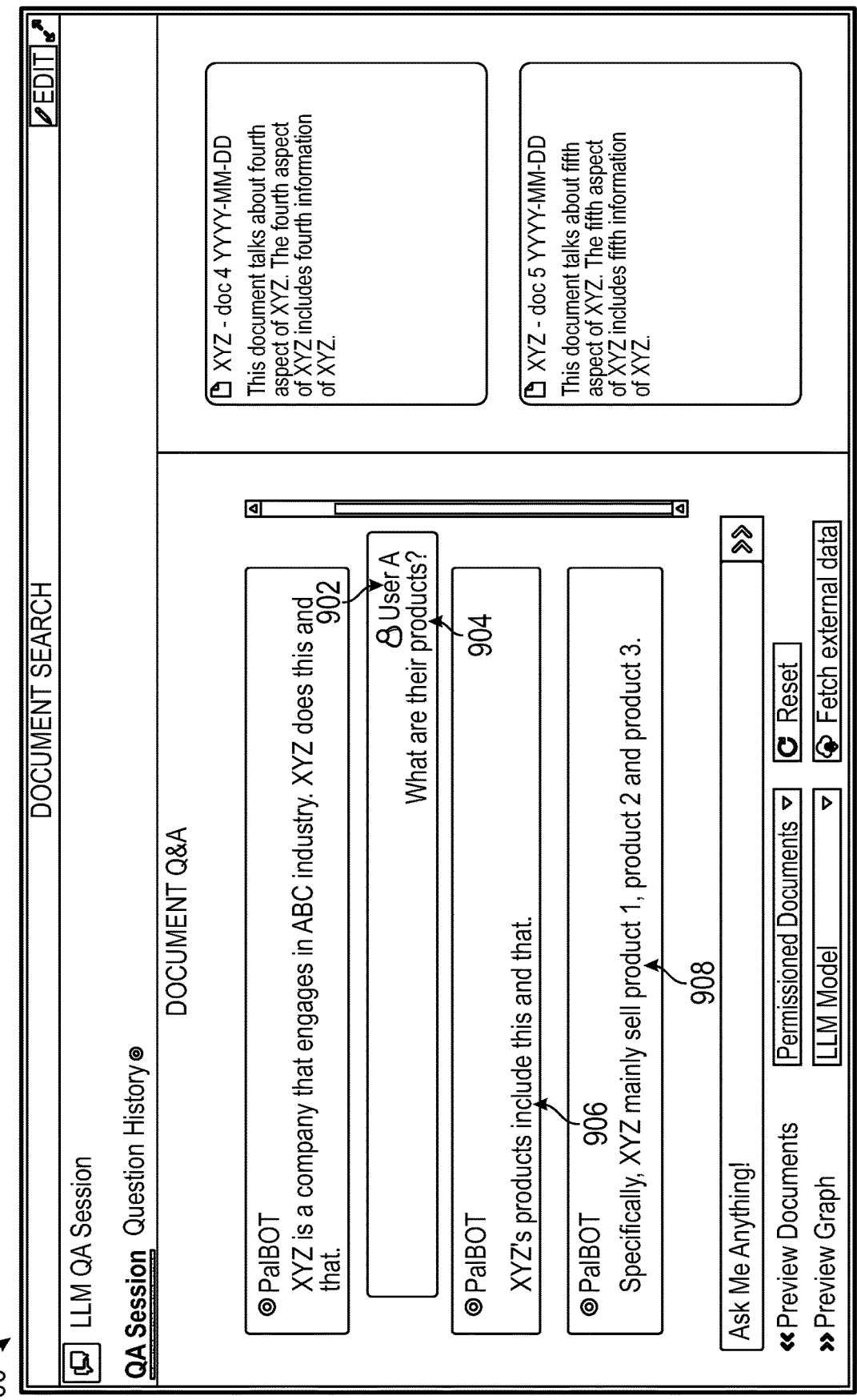

With reference to FIG. 9, an example user interface 900 illustrates responses to further user query. The display portion 902 and 904 show another question the user 150 submits to the document search system 102 following the user query shown in the display portion 804. Here, the display portion 904 states "What are their products?", which may mean "What are XYZ's products?" Based on the context, the document search system 102 may understand the user 150 is further querying the products of XYZ company and may generate prompt for the LLM 130 to generate responses that may be displayed in the message portion 906 and the message portion 908. Here, the message portion 906 reads that "XYZ's products include this and that." The message portion 908 reads that "Specifically, XYZ mainly sell product 1, product 2 and product 3."

Figure 10:
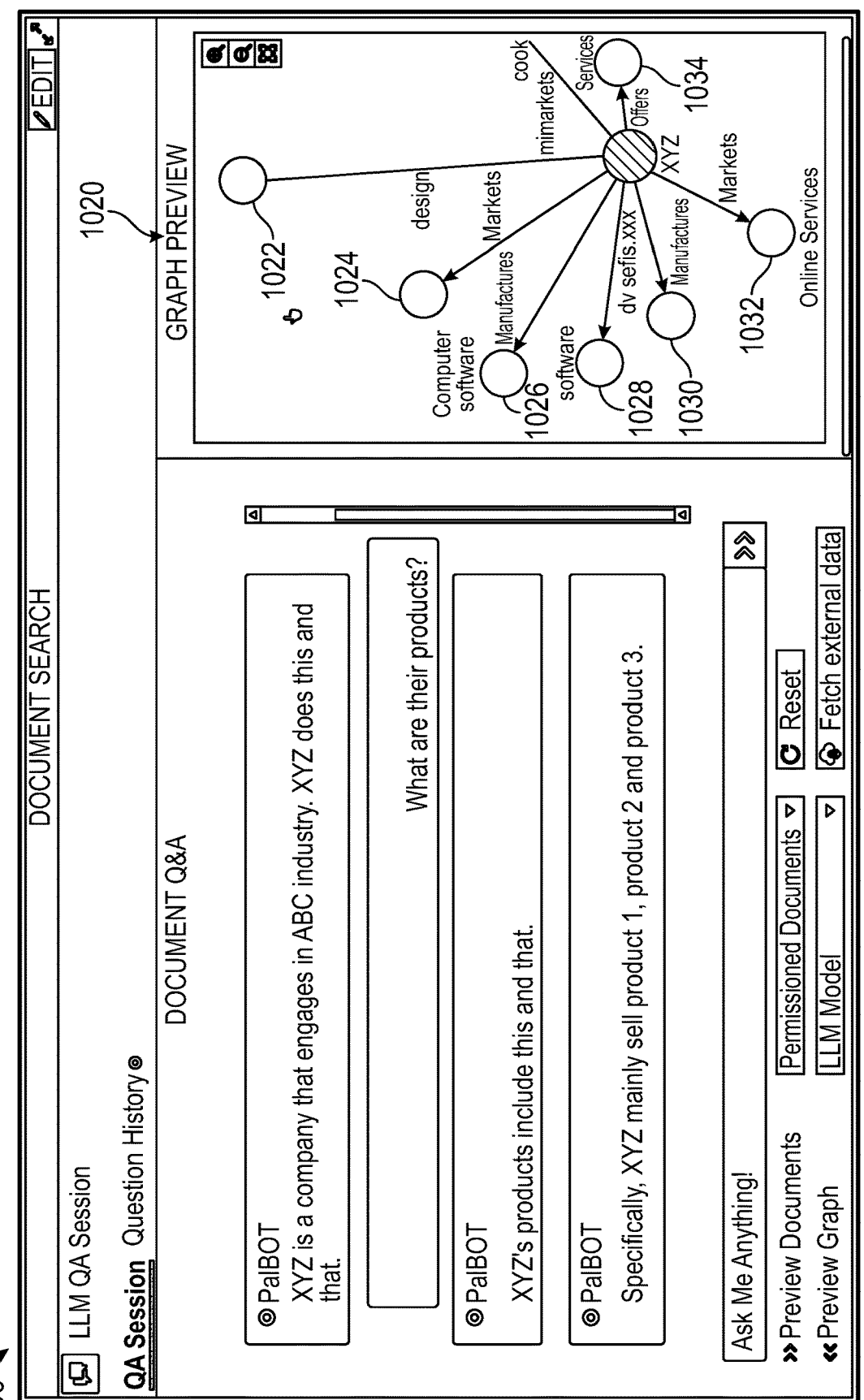

FIG. 10 shows an example user interface 1000 that may include a graphical representation of the responses provided by the LLM 130 in answering one or more user queries submitted by the user 150. The user interface 1000 includes a graphical preview 1020 that may be a graphical representation of the responses shown in the message portion 806, the message portion 906, and/or the message portion 908 provided by the LLM 130.

The graphical preview 1020 may include a display portion 1022 that may shows a first line of product sold by the XYZ company, a display portion 1024 that may shows a second line of product sold by the XYZ company, a display portion 1026 that may shows a third line of product sold by the XYZ company, a display portion 1028 that may shows a fourth line of product sold by the XYZ company, a display portion 1030 that may shows a sixth line of product sold by the XYZ company, a display portion 1032 that may shows a seventh line of product sold by the XYZ company, a display portion 1022 that may shows a eight line of product sold by the XYZ company, and a display portion 1034 that shows a ninth line of product sold by the XYZ company. As noted above, the graphical representation of the responses from the LLM 130 shown in the message portion 806, the message portion 906, and/or the message portion 908 may allow the user 150 to more easily perceive the responses from the LLM 130 to enhance user experience.

Figure 11:
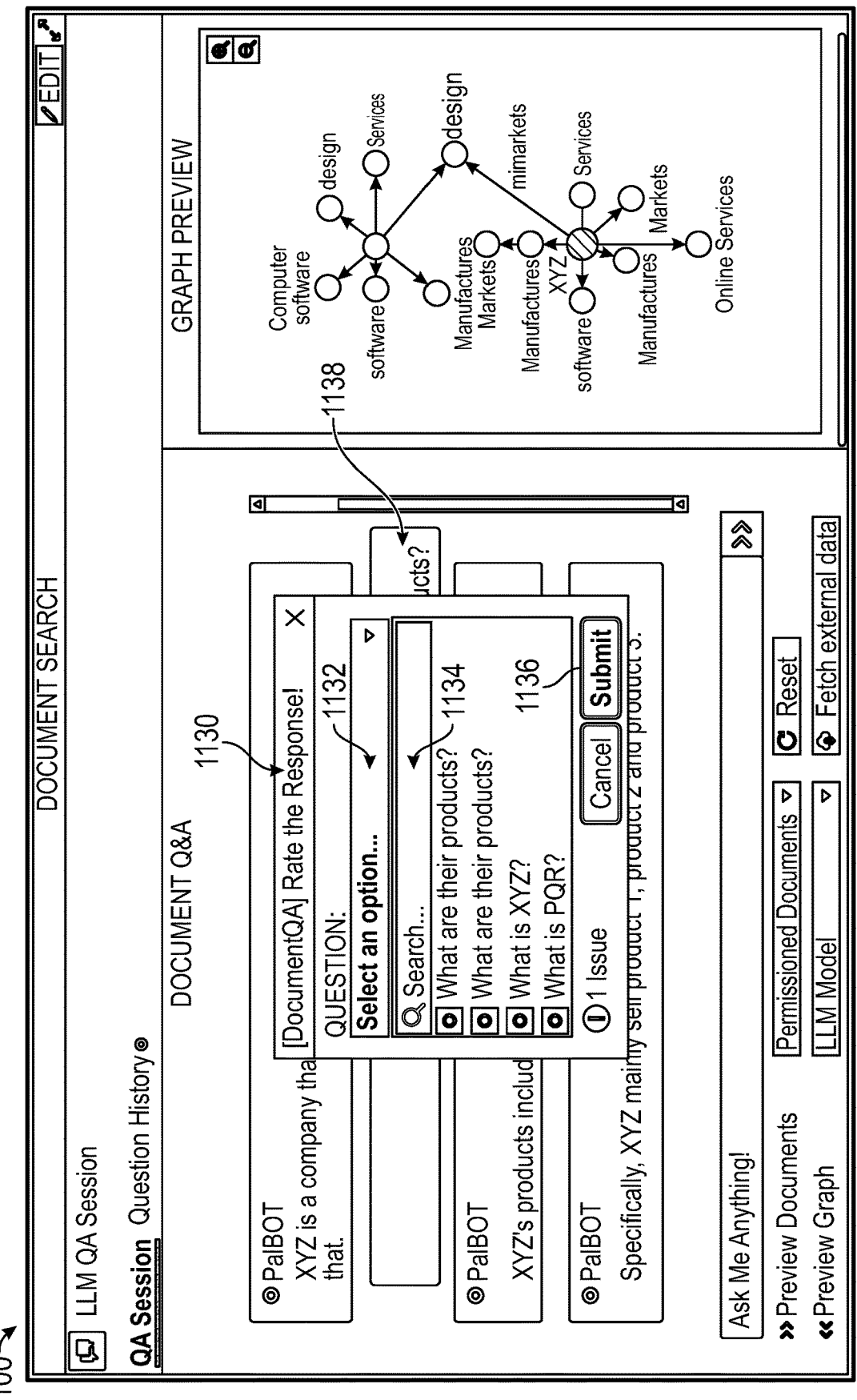

FIG. 11 illustrates an example user interface 1100 that allows the user 150 to provide feedback to the document search system 102 and/or the LLM 130. As shown in FIG. 11, a dialog box 1130 states "[DocumentQA Rate the Response!]" to allow a user, such as the user 150, to provide feedback to indicate whether the output of the LLM 130 was a correct or acceptable result given the user query. In various implementations, the dialog box 1130 may be shown through the user interface 1100 in response to the user 150 pressing the button 704.

As shown in FIG. 11, the user interface 1100 includes the menu 1132 to allow the user 150 to select a question submitted by the user 150 for rating. Here, the menu 1132 reads "Select an option," prompting the user 150 to select a question toward which the user 150 would like to rate an associated answer provided by the document search system 102 and/or the LLM 130. Instead of selecting a question from several options through the menu 1132, the user interface 1100 may further include the search column 1134 to allow the user 150 to key-in and search a question toward which the user 150 would like to rate an associated answer provided by the document search system 102 and/or the LLM 130.

Alternatively, the user 150 may directly select, using an input device (e.g., a mouse), one or more questions that are displayed (e.g., the display portion 1138) within the user interface 1100.

The user interface 1100 may further include a button 1136 that allows the user 150 to submit the rating once the user 150 selects a question and rates an answer associated with the question. As noted above, the document search system 102 may use the feedback to fine-tune the performance of the LLM 130, such as by adjusting or modifying one or more weights associated with the LLM 130, or trigger training and/or re-training of the LLM 130. Although not illustrated in FIG. 11, the document search system 102 may use the user feedback about the output from the LLM 130 to generate an updated prompt for the LLM 130.

Additional Example Implementations and Details

In an implementation of the system (e.g., one or more aspects of the document search system 102, one or more aspects of the computing environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 12) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In various implementations the virtual computing environment may comprise one or more virtual machines, containers, and/or other types of emulations of computing systems or environments. In various implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code." "instructions," "module," "application," "software application," "service." and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In various alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in various implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers." "computer devices," "computing devices," "hardware computing devices." "hardware processors." "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 12:
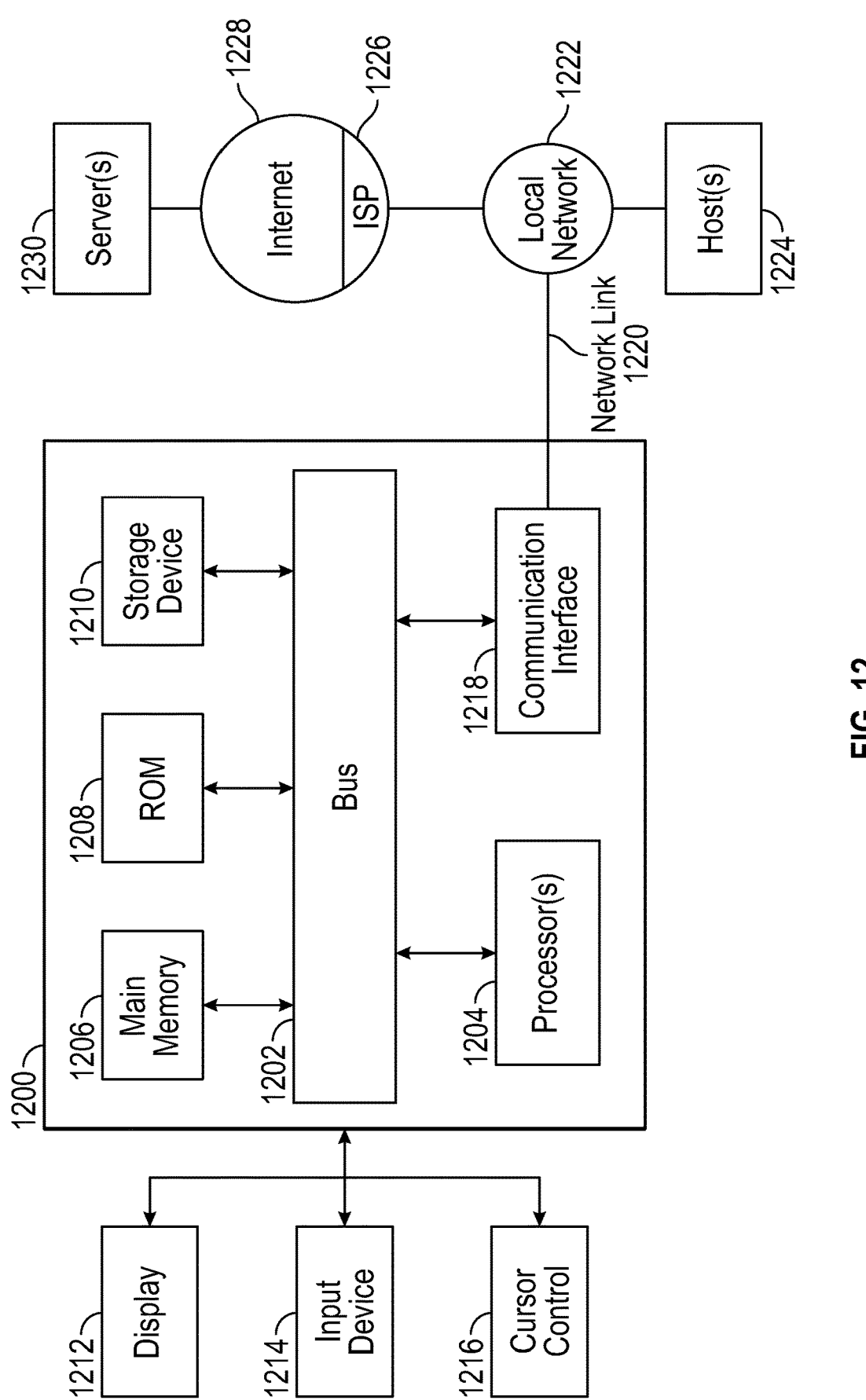
FIG. 12 is a block diagram of an example computer system consistent with various implementations of the present disclosure.

For example, FIG. 12 shows a block diagram that illustrates a computer system 1200 upon which various implementations and/or aspects (e.g., one or more aspects of the computing environment 100, one or more aspects of the document search system 102, one or more aspects of the user 150, one or more aspects of the document source 120, one or more aspects of the LLMs 130*a* and 130*b*, and/or the like) may be implemented. Multiple such computer systems 1200 may be used in various implementations of the present disclosure. Computer system 1200 includes a bus 1202 or other communication mechanism for communicating information, and a hardware processor, or multiple processors, 1204 coupled with bus 1202 for processing information. Hardware processor(s) 1204 may be, for example, one or more general purpose microprocessors.

Computer system 1200 also includes a main memory 1206, such as a random-access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions. The main memory 1206 may, for example, include instructions to implement server instances, queuing modules, memory queues, storage queues, user interfaces, and/or other aspects of functionality of the present disclosure, according to various implementations.

Computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), and/or the like, is provided and coupled to bus 1202 for storing information and instructions.

Computer system 1200 may be coupled via bus 1202 to a display 1212, such as a cathode ray tube (CRT) or LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In various implementations, the same direction information and command selections as cursor control may be implemented via receiving touches on a touch screen without a cursor.

Computer system 1200 may include a user interface module to implement a GUI that may be stored in a mass storage device as computer executable program instructions that are executed by the computing device(s). Computer system 1200 may further, as described below, implement the techniques described herein using customized hard-wired logic, one or more ASICs or FPGAs, firmware and/or program logic which in combination with the computer system causes or programs computer system 1200 to be a special-purpose machine. According to one implementation, the techniques herein are performed by computer system 1200 in response to processor(s) 1204 executing one or more sequences of one or more computer-readable program instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicated with a WAN). Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic, or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could." "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z." or "at least one of X. Y, or Z." unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one." "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computerized method, performed by a computing system having one or more hardware computer processors and one or more non-transitory computer readable storage devices storing software instructions executable by the computing system, the computerized method comprising: receiving, from a user via a user interface, a first user input comprising a natural language query; vectorizing the first user input into a query vector; executing, using the query vector, a similarity search in a document search model to identify one or more similar document portions, wherein the document search model comprises a plurality of vectors corresponding to a plurality of portions of a set of documents; generating a first prompt for a large language model ("LLM"), the first prompt comprising at least: the first user input, and the one or more similar document portions; transmitting the first prompt to the LLM; receiving a first output from the LLM in response to the first prompt; and providing, via the user interface, the first output from the LLM.

Clause 2. The computerized method of claim 1 further comprising: generating the document search model, wherein generating the document search model comprises: chunking documents of the set of documents into the plurality of portions of the set of documents; and vectorizing the plurality of portions of the set of documents to generate the plurality of vectors.

Clause 3. The computerized method of claim 2, wherein generating the document search model further comprises: normalizing, transforming, and/or providing context to the plurality of portions of the set of documents.

Clause 4. The computerized method of any of claims 1-3, wherein the first prompt further comprises extended portions of the set of documents that are adjacent to the one or more similar document portions.

Clause 5. The computerized method of any of claims 1-4 further comprising: obtaining, from a database that stores the one or more similar document portions and/or the set of documents, the one or more similar document portions and/or extended portions of the set of documents that are adjacent to the one or more similar document portions.

Clause 6. The computerized method of any of claims 1-5 further comprising: obtaining a context associated with the first user input, wherein the first prompt further comprises at least: the context associated with the first user input.

Clause 7. The computerized method of claim 6, wherein the context associated with the first user input includes at least a part of a conversation history of the user, and wherein the part of the conversation history of the user is related to the first user input.

Clause 8. The computerized method of claim 6 further comprising: generating the context associated with the first user input, wherein generating the context associated with the first user input comprises: summarizing a conversation history using the LLM or another LLM.

Clause 9. The computerized method of any of claim 1-8, wherein the similarity search comprises a cosine similarity search.

Clause 10. The computerized method of any of claim 1-9, wherein the one or more similar document portions comprise a quantity n most similar portions of the set of documents.

Clause 11. The computerized method of any of claim 1-10, wherein the one or more similar document portions comprise similar document portions having a threshold similarity with the first user input.

Clause 12. The computerized method of any of claims 1-11, wherein the first output is a natural language output.

Clause 13. The computerized method of any of claims 1-12 further comprising: providing, via the user interface, the one or more similar document portions for the user to preview.

Clause 14. The computerized method of any of claims 1-12 further comprising: providing, via the user interface, a graphical representation of the first output from the LLM.

Clause 15. The computerized method of any of claims 1-12 further comprising: receiving, from the user via the user interface, a user feedback related to the first output from the LLM; generating training data and/or an updated prompt based at least on the user feedback; and optionally training the LLM using the training data.

Clause 16. The computerized method of any of claims 1-15, wherein each of the plurality of portions of the set of documents and/or each of the one or more similar document portions comprises at least one of: a word, a sentence, a plurality of sentences, a paragraph, or a plurality of paragraphs.

Clause 17. The computerized method of any of claims 1-16, wherein documents of the set of documents are associated with respective permissions, and where the user is permissioned to access the documents.

Clause 18. The computerized method of any of claims 1-17 further comprising: generating a session data object for a query session of the user, wherein the session data object is associated at least with the first user input, the one or more similar document portions, context associated with the first user input, and the first output.

Clause 19. A system comprising: one or more computer-readable storage mediums having program instructions embodied therewith; and one or more processors configured to execute the program instructions to cause the system to perform the computerized method of any of claims 1-18.

Clause 20. A computer program product comprising one or more computer-readable storage mediums having program instructions embodied therewith, the program instructions executable by one or more processors to cause the one or more processors to perform the computerized method of any of claims 1-18.

What is claimed is:

1. A computerized method, performed by a computing system having one or more hardware computer processors and one or more non-transitory computer readable storage devices storing software instructions executable by the computing system, the computerized method comprising:

receiving, from a user via a user interface, a first user input comprising a natural language query;

vectorizing the first user input into a query vector;

normalizing, based on context associated with the first user input, a plurality of portions of a set of documents;

executing, using the query vector, a similarity search in a document search model to identify one or more similar document portions, wherein the document search model comprises a plurality of vectors corresponding to the plurality of portions of the set of documents that were normalized;

generating a first prompt for a large language model ("LLM"), the first prompt comprising at least: the first user input, and the one or more similar document portions;

transmitting the first prompt to the LLM;

receiving a first output from the LLM in response to the first prompt, wherein the first output comprises a natural language response to the natural language query, the natural language response generated by the LLM and being in a natural language; and providing, via the user interface, the first output from the LLM.

2. The computerized method of claim 1 further comprising:

generating the document search model, wherein generating the document search model comprises:

chunking documents of the set of documents into the plurality of portions of the set of documents; and vectorizing the plurality of portions of the set of documents to generate the plurality of vectors.

3. The computerized method of claim 2, wherein generating the document search model further comprises:

providing context to the plurality of portions of the set of documents.

4. The computerized method of claim 1, wherein the first prompt further comprises extended portions of the set of documents that are adjacent to the one or more similar document portions.

5. The computerized method of claim 1 further comprising:

obtaining, from a database that stores the one or more similar document portions and/or the set of documents, the one or more similar document portions and/or one or more extended portions of the set of documents that are adjacent to the one or more similar document portions.

6. The computerized method of claim 1 further comprising:

obtaining the context associated with the first user input, wherein the first prompt further comprises at least: the context associated with the first user input.

7. The computerized method of claim 6, wherein the context associated with the first user input includes at least a part of a conversation history of the user, and wherein the part of the conversation history of the user is related to the first user input.

8. The computerized method of claim 6 further comprising:

generating the context associated with the first user input, wherein generating the context associated with the first user input comprises:

summarizing a conversation history using the LLM or another LLM.

9. The computerized method of claim 1, wherein the similarity search comprises a cosine similarity search.

10. The computerized method of claim 1, wherein the one or more similar document portions comprise a quantity n most similar portions of the set of documents.

11. The computerized method of claim 1, wherein the one or more similar document portions comprise similar document portions having a threshold similarity with the first user input.

12. The computerized method of claim 1, wherein the first output is a natural language output.

13. The computerized method of claim 1 further comprising:

providing, via the user interface, the one or more similar document portions for the user to preview.

14. The computerized method of claim 1 further comprising:

providing, via the user interface, a graphical representation of the first output from the LLM.

15. The computerized method of claim 1 further comprising:

receiving, from the user via the user interface, a user feedback related to the first output from the LLM;

generating training data and/or an updated prompt based at least on the user feedback; and training the LLM using the training data.

16. The computerized method of claim 1, wherein each of the plurality of portions of the set of documents and/or each of the one or more similar document portions comprises at least one of: a word, a sentence, a plurality of sentences, a paragraph, or a plurality of paragraphs.

17. The computerized method of claim 1, wherein documents of the set of documents are associated with respective permissions, and where the user is permissioned to access the documents.

18. The computerized method of claim 1 further comprising:

generating a session data object for a query session of the user, wherein the session data object is associated at least with the first user input, the one or more similar document portions, the context associated with the first user input, and the first output.

19. A system comprising:

one or more computer-readable storage mediums having program instructions embodied therewith; and one or more processors configured to execute the program instructions to cause the system to perform the computerized method of claim 1.

20. A computer program product comprising one or more computer-readable storage mediums having program instructions embodied therewith, the program instructions executable by one or more processors to cause the one or more processors to perform the computerized method of claim 1.

\* \* \* \* \*